United States Patent [19]

Aubert et al.

[11] 4,290,324
[45] Sep. 22, 1981

[54] APPARATUS FOR CONTROLLING AN AUTOMATIC TRANSMISSION

[75] Inventors: Paul Aubert, Clamart; Christian Quinton, Rueil-Malmaison; Gérard Pannier, Bois d'Arcy, all of France

[73] Assignee: Regie Nationale des Usines Renault, Boulogne-Billancourt, France

[21] Appl. No.: 79,918

[22] Filed: Sep. 28, 1979

[30] Foreign Application Priority Data

Oct. 4, 1978 [FR] France .................................. 78 28436
Oct. 4, 1978 [FR] France .................................. 78 28437

[51] Int. Cl.³ ............................................ B60K 41/10
[52] U.S. Cl. ........................................ 74/866; 74/867
[58] Field of Search ............ 74/865, 866, 867, 752 A, 74/752 C, 752 D

[56] References Cited

U.S. PATENT DOCUMENTS

| | | | |
|---|---|---|---|
| 3,738,199 | 6/1973 | Rubo et al. | 74/869 |
| 3,741,042 | 6/1973 | Ravenel | 74/752 A X |
| 3,776,048 | 12/1973 | Enomoto et al. | 74/866 |
| 3,813,964 | 6/1974 | Ichimura et al. | 74/866 |
| 3,868,869 | 3/1975 | Hunt et al. | 74/866 |
| 3,937,108 | 2/1976 | Will | 74/866 |
| 3,938,409 | 2/1976 | Uozumi | 74/866 |
| 4,030,381 | 6/1977 | Lalin et al. | 74/867 |
| 4,034,627 | 7/1977 | Mizote | 74/866 |
| 4,041,809 | 8/1977 | Dick et al. | 74/866 |
| 4,073,204 | 2/1978 | Dick | 74/752 D X |

FOREIGN PATENT DOCUMENTS

| | | |
|---|---|---|
| 2119344 | 7/1972 | France . |
| 2227466 | 11/1974 | France . |
| 2307197 | 11/1976 | France . |
| 2376346 | 12/1977 | France . |
| 2248443 | 10/1978 | France . |
| 1361220 | 7/1974 | United Kingdom .................. 74/866 |
| 1437942 | 6/1976 | United Kingdom . |

Primary Examiner—Leslie Braun
Attorney, Agent, or Firm—Owen, Wickersham & Erickson

[57] ABSTRACT

A device controlling a multi-stage automatic transmission for an engine-driven vehicle with three forward drive ratios and change-under torque, damped by a hydrokinetic torque converter, and one reverse drive, of the type consisting of an epicyclic gear train actuated by two clutches and two brakes hydraulically controlled. A hydraulic distribution unit is monitored by two electric valves in order to feed selectively the two clutches and the two brakes on the basis of data concerning the running of the vehicle. The two electric valves are controlled in response to three different states of the two electric valves for providing selective feeds corresponding respectively to each of the three forward drive ratios and for providing an additional control of the electric valves in response to a fourth transient state for the transmission between the third and second forward drive ratios.

29 Claims, 27 Drawing Figures

FIG.4

| | | EL₁ | EL₂ | E₁ | E₂ | F₁ | F₂ |
|---|---|---|---|---|---|---|---|
| P | 0 | 0 | L | 0 | 0 | 0 | 0 |
| PR | AR | 0 | L | 0 | L | L | 0 |
| N | 0 | 0 | L | 0 | 0 | 0 | 0 |
| A | 1 | 0 | L | L | 0 | 0 | 0 |
| A | 2 | L | L | L | 0 | 0 | L |
| A | 3 | 0 | 0 | L | L | 0 | 0 |
| 2 | 1 | 0 | L | L | 0 | 0 | 0 |
| 2 | 2 | L | L | L | 0 | 0 | L |
| 1 | 1 | 0 | L | L | 0 | L | 0 |
| A | 2/3 | L | 0 | L | 0 | 0 | L |
| A | 3→2 | L | 0 | L | 0 | 0 | 0→L |

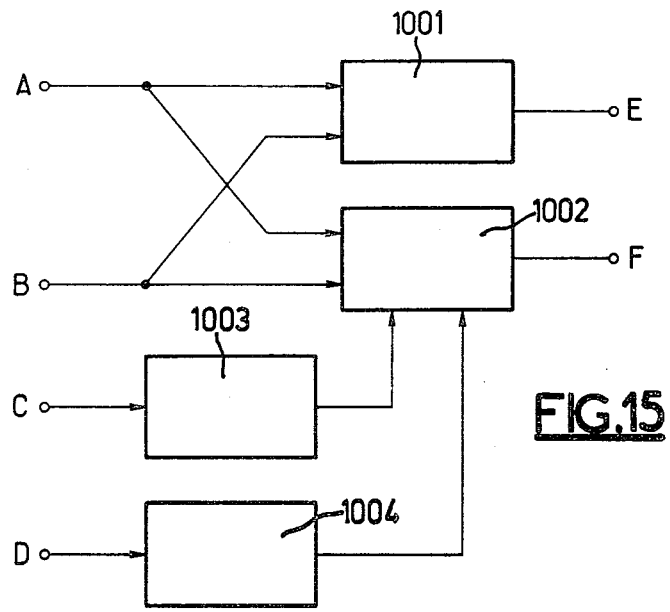
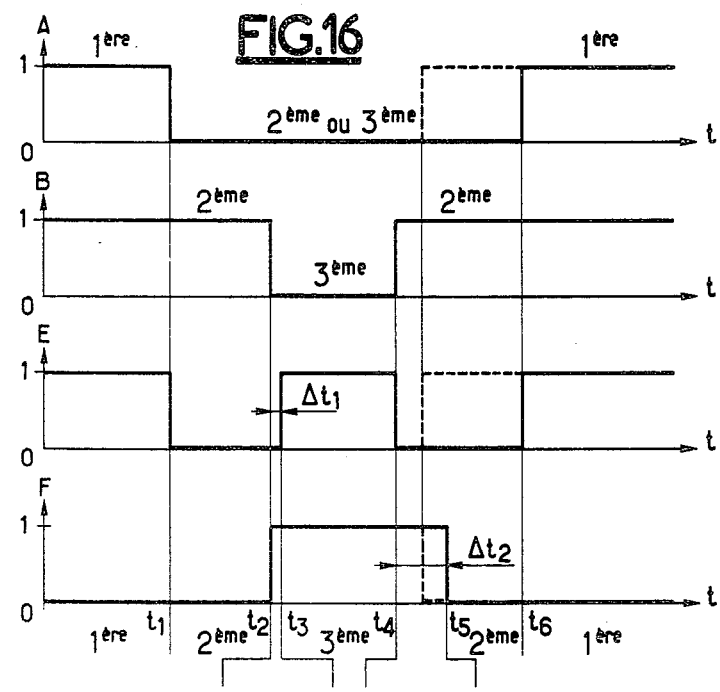

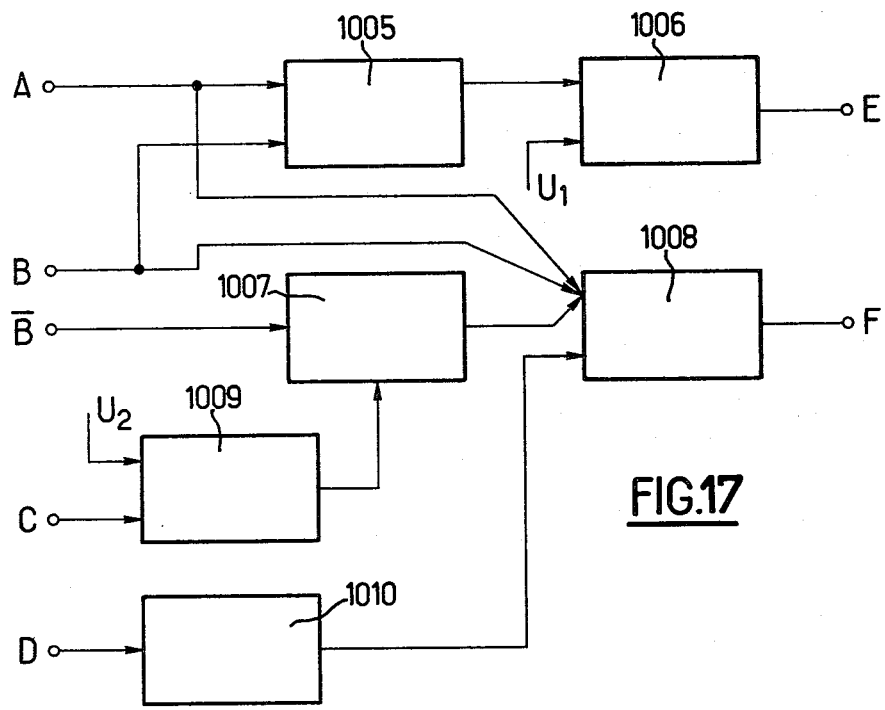
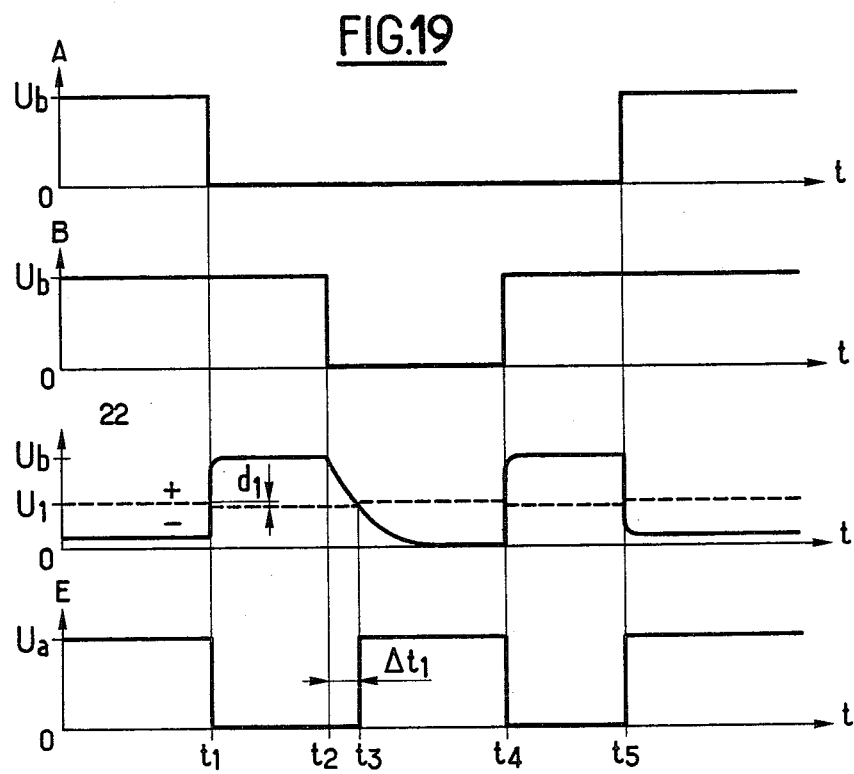

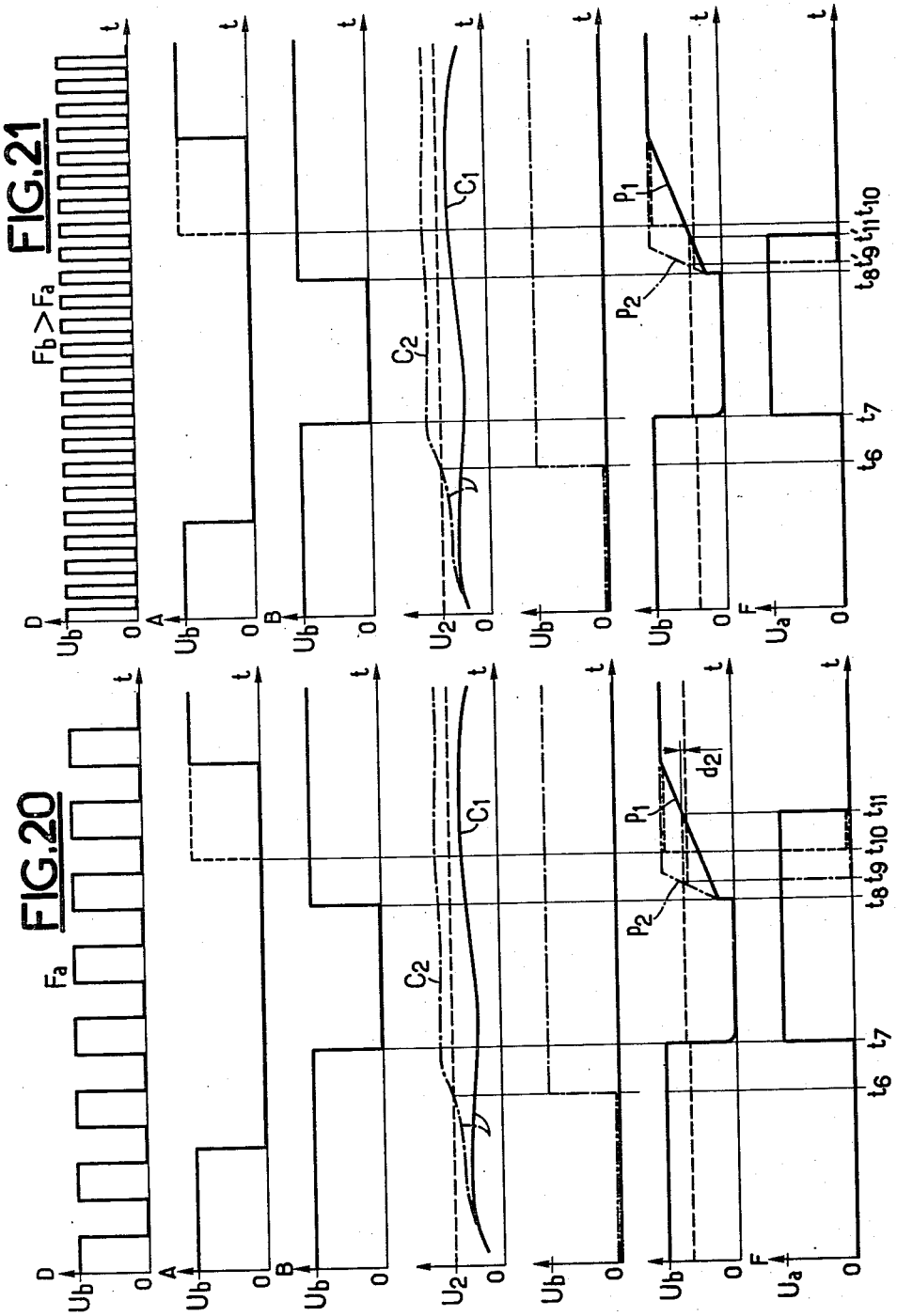

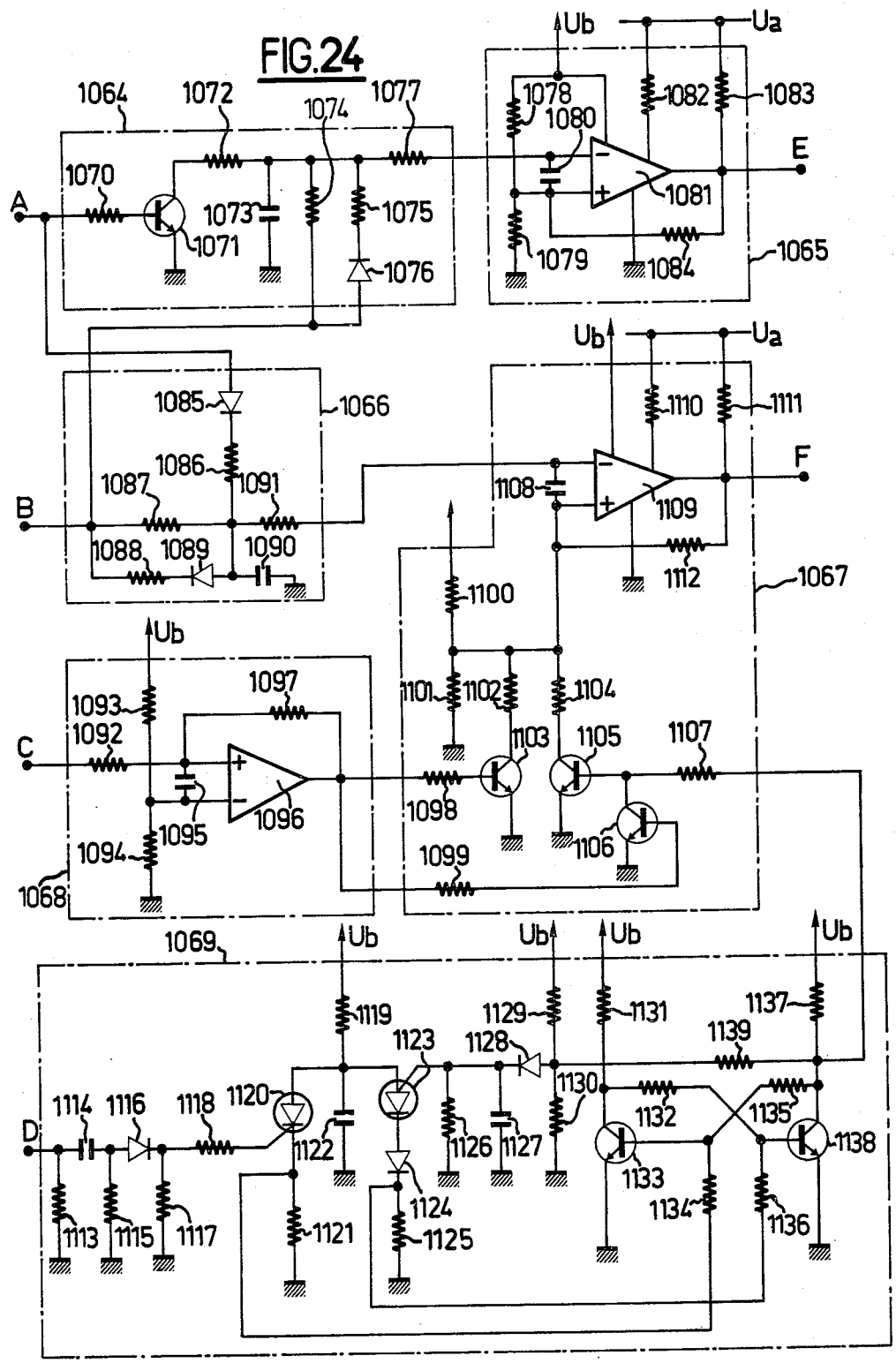

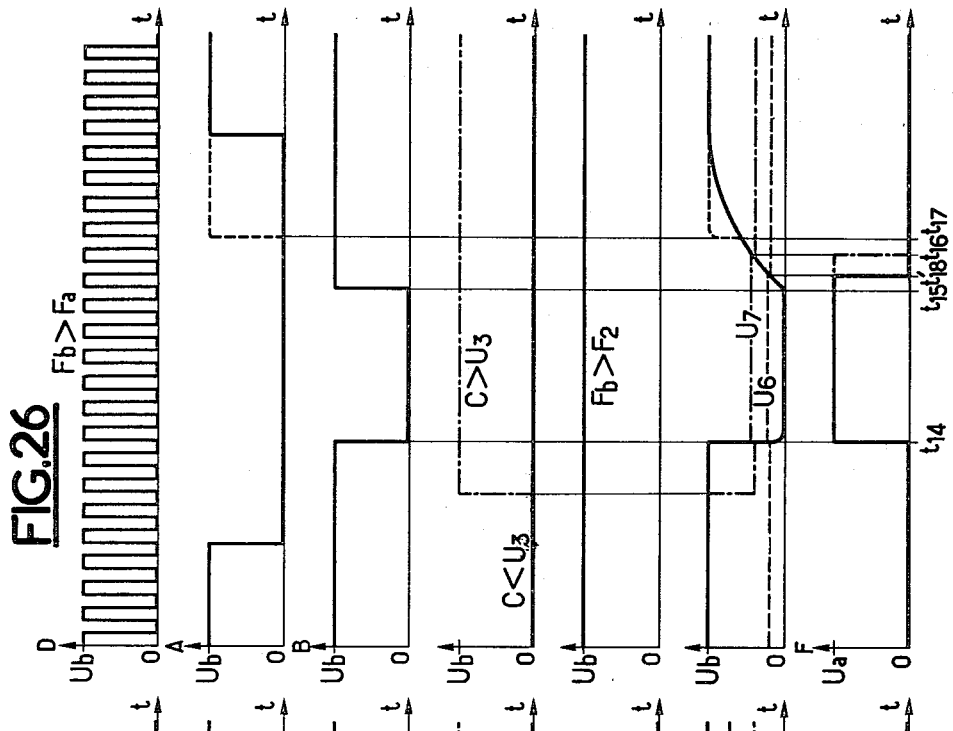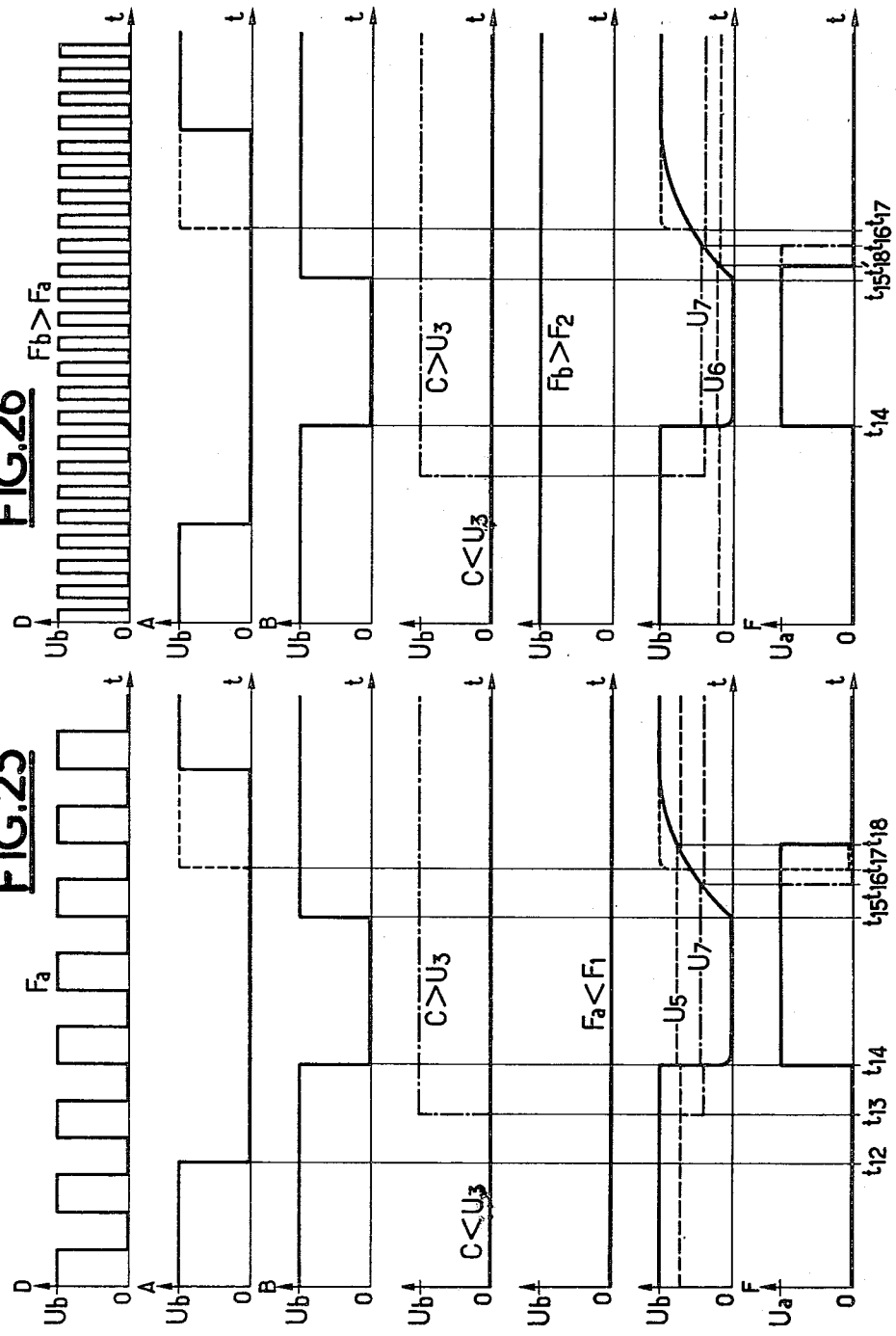

APPARATUS FOR CONTROLLING AN AUTOMATIC TRANSMISSION

BACKGROUND OF THE INVENTION

This invention relates to a control device for a multi-stage automatic transmission with three forward gear ratios, with speed changing under torque smoothed out by a hydrokinetic torque converter, and one reverse drive ratio.

Automatic transmissions of this type are already well known for automotive vehicles, and they consist mainly of a hydrokinetic torque converter and epicyclic train gearbox combined with a set of hydraulic and sometimes electronic control systems which take into consideration, in controlling the various components of the gearbox, data on the motion of the vehicle such as, in particular, its speed, as well as the motor load or, which amounts to the same thing, the position of the accelerator pedal.

The combination of a torque converter and an epicyclic gear train makes it possible to get a continuous variation in the torque applied to the vehicle wheels when starting or accelerating. In addition, it is possible to obtain gear changes which can be rapidly carried out under torque and are smoothed out by the hydrokinetic torque converter, thus providing the transmission with great flexibility in use.

The epicyclic gear train is piloted by a number of hydraulic receivers. In the case of a transmission with three forward ratios and one reverse it is thus possible to use two clutches and two brakes controlled hydraulically. The change from one ratio to the other is performed by locking or releasing one of these receivers and by releasing or locking the other receiver. It is necessary to provide a transient period, in particular when changing from the third to the second forward ratio and vice versa in order to enable the vehicle drive motor to adapt its speed to the new transmission ratio.

These clutches and brakes are controlled through a hydraulic unit monitored by two electric valves in order to feed the two clutches and the two brakes selectively, so that the different ratios of the transmission are obtained. The selective feed of the said electric valves takes into account the information on the running of the vehicle equipped with the transmission. In practice, an electronic device called a governor-comparator supplies signals corresponding to the threshold of the change from the first to the second forward drive ratio and to the threshold of the change from the second to the third forward drive ratio. In addition, this electronic device supplies a signal which depends upon the position of the accelerator pedal, thus providing information on the load of the vehicle drive motor. Finally, the device also supplies a signal corresponding to the vehicle speed.

The electronic governor-comparator takes these different pieces of information into account as well as the position of the selector lever handled by the driver and a so-called "kick-down" signal, which is placed at the end of the accelerator travel and enables the changing down of the ratios to be forced within a certain allowable range of speeds, in order to supply the two electric valves controlling the hydraulic circuit which monitors the gearbox with signals capable of opening or closing these electric valves.

French Pat. No. 1,528,878 describes a hydraulic control device for such an automatic transmission. In that patent, the epicyclic gear train is operated by means of two clutches and two brakes which are hydraulically controlled, while the epicyclic train also includes a freewheel system. The hydraulic control system comprises, mainly, a hydraulic selector or control valve which can take up three positions corresponding to the three forward speeds and which is monitored by two electric valves in order to feed selectively the two clutches and two brakes mentioned above, in order to define the three forward ratios of the transmission. A hydralic valve, called a relay valve, is also inserted in the hydraulic circuit between the hydraulic selector valve and the receivers formed by the above-mentioned clutches and brakes. This relay valve makes it possible to produce the overlap necessary between the second and third speeds to obtain a third-to-second change or vice versa without any break in the mechanical connection between the gearbox input and the output shafts, without racing the motor and without jerkiness for the vehicle driver. This overlap time is defined by hydraulic means.

French Pat. No. 2,313,608 describes another embodiment applying hydraulic delay means acting on change from the third to the second ratio and vice versa.

These hydraulic delays, which depend either on the filling time of one of the receivers or on the time of movement of the hydraulic valve spools can only, however, be determined approximately, without taking into consideration all the parameters concerning the running of the vehicle.

One object of this invention is to provide a device to control such an automatic transmission which accomplishes a smooth changeover between the third and second forward speed ratios.

Another object of the present invention is to make it possible to separate the function of control of the various components of the automatic transmission from the delay function required to determine the duration of the transient state between these two transmission speed ratios. It then becomes possible to entrust the delay function to means specially designed for this purpose, preferably electonic means in particular.

Another object of this invention is to provide the two electric valves monitoring the hydraulic control device for such a transmission with signals, particularly for the change from the third to the second forward drive ratio and vice versa, which makes it possible to obtain a suitable duration of the transient state of the control device which corresponds to the fourth state of the two electric valves.

SUMMARY OF THE INVENTION

The device of the invention is specially suited for the control of a multi-stage automatic transmission for automotive vehicles, with three forward ratios with speed changing under torque smoothed out by a hydrokinetic torque converter and one reverse drive ratio. The automatic transmission is preferably of the type which has an epicyclic gear train actuated by two clutches and two hydraulically controlled brakes.

The device of the invention comprises a hydraulic selector monitored by two electric valves, so as to selectively feed the two clutches and the two brakes of the epicyclic gear train. Both electric valves are energized according to information on the running of the vehicle fitted with the transmission. These data may consist, in particular, of the vehicle speed as well as the vehicle drive motor load, or, which comes to the same thing, the position of the accelerator pedal.

According to the invention, the means of controlling the two electric valves are arranged so as to use, in addition to the three different states of the electric valves for selective feed corresponding respectively to the three forward speed ratios, a fourth possible state for the change from the third to the second forward drive ratio. It is possible in this way, using this fourth state of the two electric valves, to put the transmission into a transient state providing the change from the third to the second ratio with no break in the mechanical linkage between the input and output shafts, thus eliminating any jerkiness for the vehicle driver.

In a preferred embodiment, the control device comprises two change valves, each fitted with a selector spool which may take up two positions only under the effect of the electric valve combined with it.

The device of the invention also comprises means to determine the duration for which the fourth transient state is maintained, in accordance with data on the running of the vehicle fitted with the transmission and, in particular, on the vehicle speed and the drive motor load. These means preferably consist of an electronic unit feeding the two electric valves with control signals capable, in particular, of maintaining the above-mentioned transient state for a duration which varies according to the abovementioned various vehicle running parameters. Of course, it would be possible to employ other methods, such as hydraulic methods, to determine the duration for which this fourth transient state is maintained. However, electronic methods make it easier to take the vehicle running parameters into consideration.

The control device of this invention preferably comprises a two-spool relay valve which is able to define the three states according to their respective positions. The relay valve may feed respectively one of the hydraulically-controlled clutches and the two hydraulically-controlled brakes operating the epicyclic train. The two change valves mentioned above are connected together and to inlets of the relay valve so that, in the fourth transient state of the two electric valves, the filling of one of the brakes, used for the second transmission ratio, occurs at high speed via the relay valve through a feed duct fitted with a wide diameter restriction, and so that, in another state of the two electric valves corresponding to the constant condition of the second forward drive ratio, the filling of the abovementioned brake occurs through the relay valve at low speed through a slow feed duct fitted with a small diameter restriction.

The change from the third forward ratio, in which both clutches are closed and no brake is actuated, to the second transmission ratio in which only one of the clutches and one of the brakes are locked, is performed according to the invention by means of a transient state during which one of the clutches used for the third gear is emptied while the brake needed to set up the second ratio fills up. The transient state means that it is possible to vary the total time taken to fill this hydraulic brake by varying, as previously stated, the hydraulic fluid feed flow for this brake during the change from the third to the second ratio. It is therefore possible, by varying the duration of the fourth transient state of this invention, to take into consideration, for the third-to-second ratio change time, the running conditions of the vehicle, in particular its speed and the position of the accelerator pedal, so as to enable the motor to reach the synchronous speed required to set up the transmission's second ratio.

The relay valve preferably consists of two selector spools separated by an intermediate chamber and acted upon by a return spring which tends to push both spools in one direction with a force that slightly exceeds the friction of the spools in the valve body. The relay valve also comprises an end chamber joining up with one of the clutches which must be engaged for the third ratio and open for the second. This end chamber is capable of causing movement of one of the spools of the said valve, the cut-out spool, against the pressure acting in the intermediate chamber, from a position in which the second brake, which is locked for the second ratio, is fed through the relay valve, to a position in which the brake is not fed.

In this way it is possible, by feeding the intermediate chamber of the relay valve at an intermediate set pressure, to cut off or feed the brake used for the second ratio, depending upon the variation in the hydraulic fluid pressure existing in the clutch used for the third ratio. The set pressure obtained in the intermediate chamber when both change valves are open is advantageously defined by the intermediate pressure existing between the two series restrictions designed in a duct at the line pressure.

When both spools of the relay valve have been pushed back against the return spring under the effect of the pressure existing in the end chamber connecting with the above-mentioned clutch, the relay valve enables another brake, or reverse drive brake, to be fed. In addition, a restriction is placed between the said clutch and the end chamber of the relay valve so that, in this position of the valve, the reverse drive brake is filled before the clutch, so as to prevent the jolt due to the change to reverse.

The pressure of the hydraulic fluid feeding the control device is preferably defined by means of a pressure-regulating valve which is capable of determining a first or high pressure level for the reverse drive and the neutral position of the transmission, a second or intermediate pressure level defined between two restrictions in series for the first forward drive ratio and a third or low pressure level for the second and third forward drive ratios. A diaphragm-type depression sensor can profitably be combined with the pressure-regulating valve so as, when establishing the hydraulic fluid pressure level, to take into account the depression existing downstream of the vehicle drive motor carburetor throttle. It is possible in this way to change the hydraulic fluid pressure according to the requirements of the clutches and brakes and take into account the variation in transmitted torque according to the position of the accelerator pedal.

The control device also comprises a conventional manual valve permitting the device to be fed with hydraulic fluid and the transmission's first clutch or forward drive clutch to be fed directly. The manual valve is operated by a control lever or selector lever which enables the driver to use the various possibilities of the automatic gearbox.

When the first change valve is open and the second change valve closed, the relay valve can only be fed with hydraulic fluid by the manual valve. When this latter is no longer feeding the relay valve either, the two brakes and the clutch used for the third gearbox ratio are emptied, the relay valve spools being pushed by return springs. In this position the manual valve can feed the first or forward drive clutch, in which case a configuration occurs which corresponds to the first speed ratio. In this case, the two change valves allow a fluid leakage to escape downstream of the two above-mentioned series restrictions, with the pressure control valve thus setting up the line pressure at the intermediate level.

When the two change valves are closed with the manual valve placed in order to feed the first or forward drive clutch, the hydraulic fluid at the line pressure set at the low level by the pressure regulating valve feeds the intermediate chamber of the relay valve and thus the second brake, and this corresponds to the second transmission ratio.

When both change valves are open with the manual valve placed in order to feed the first or forward drive clutch, the first change valve allows a fluid leakage to escape below the two above-mentioned restrictions feeding the intermediate chamber of the relay valve at the set pressure. The second clutch is fed at the line pressure through a restriction by means of the two change valves and the end chamber of the relay valve is subjected to the pressure existing in this second clutch. The configuration that then occurs corresponds to the third transmission ratio.

When the driver depresses the accelerator pedal and if the vehicle speed is high, it is necessary that the time for the change from the third to the second transmission ratio be long enough to enable the drive motor of the vehicle to reach a relatively high synchronism speed. Such a long change can be obtained by providing a short duration for the transient state of the hydraulic control device, during which the filling of the brake necessary for the second speed ratio to be established is done rapidly.

On the contrary, when the driver keeps depressing the accelerator pedal while the vehicle speed is still low, a relativey short time for the change from the third to the second speed is enough, this duration being sufficient to enable the motor to reach the synchronism speed which, this time, is low. The transient state of the hydraulic control device should then be maintained for a longer time. This transient state corresponds indeed to a rapid filling of the hydraulic brake necessary for the second ratio and the total change time is finally shorter.

A third case should be also considered, i.e when the driver has released the accelerator during a time when the vehicle speed is low. In this case, the synchronism speed of the motor is low. However, in this case the motor can only be brought up to normal running speed by using the vehicle kinetic energy, which then drives the motor through the gearbox from the very beginning of the change. Taking this situation into account, a relatively long time should be allowed for the motor to reach the synchronism speed. In this case, the transient state of the hydraulic control device again should be maintained for a short time.

In the case of the change from the second ratio to the third ratio, a constant short duration is enough for this transient state. On the contrary, for the change from the third to the second speed ratio, as explained above, the electric valves should be provided with control signals properly timed in order to ensure a variable duration for the change time and for the transient state of the hydraulic control device.

The sequential switching device according to the invention acts upon two electric valves monitoring a hydraulic control device for an automatic transmission having three forward drive ratios with the change being done under torque, and one reverse ratio, on the basis of signals depending upon the running of the vehicle equipped with the transmission. These signals particularly comprise two signals respectively corresponding to the threshold of the change from the first to the second forward drive ratio and to the threshold of the change from the second to the third forward drive ratio, a signal depending upon the position of the accelerator pedal and a frequency signal depending upon the vehicle speed. According to the invention, the switching device comprises a first processing unit for the two signals corresponding to the forward drive ratio change thresholds which provides a first control signal for the first electric valve with a first constant time delay. This first signal ensures a relatively short and constant duration, whatever the running of the vehicle, for the transient state of the hydraulic control device on changing from the second to the third forward drive ratio.

The device of the invention also comprises a second processing unit for the two signals corresponding to the ratio changing thresholds which also receives the signal depending upon the position of the accelerator pedal and the frequency signal depending upon the vehicle speed. This second processing unit provides a second control signal for the second electric valve with a second time delay the duration of which varies in relation to the signals depending upon the position of the accelerator pedal and the vehicle speed respectively. This second time delay provides for the variable duration of the transient state of the hydraulic control device for the change from the third to the second forward drive ratio and allows the vehicle drive motor the time necessary to reach the appropriate synchronism speed.

Other features and advantages of this invention will become apparent from the following description of a particular embodiment given as an example and not restricted thereto, with reference to the enclosed drawings.

BRIEF DESCRIPTION OF THE DRAWINGS

FIG. 4 is a table showing the states of the various components of the control device and of the transmission according to the position of the selector lever and the ratio engaged.

FIG. 15 is a simplfied block diagram of the electrical circuit of a device of the invention.

FIG. 16 is a wave-form diagram at the inputs and outputs of the device of the invention.

FIg. 17 is a block diagram of a first embodiment of a control circuit which can be utilized for the device of the invention.

FIG. 19 is a diagram showing the time variation of the wave forms obtained at different points of the circuit of FIG. 18 in relation to the input signals for the first output signal.

FIGS. 20 and 21 are diagrams showing the time variation of the wave forms obtained at various points of the circuit illustrated in FIG. 18 in relation to the input signals for the second output signal according to the frequency of the input signal corresponding to the vehicle speed and according to the value of the signal depending upon the position of the accelerator pedal.

FIG. 24 is a detailed electronic diagram of an examle of a circuit which can perform the functions illustrated in FIG. 23.

FIGS. 25 and 26 are diagrams showing the time variation of the wave forms obtained at various points of the electronic circuit of FIG. 24 in relation to the input signals showing the second output signal according to the frequency of the input signal corresponding to the vehicle speed and according to the value of the signal depending upon the position of the accelerator pedal.

DESCRIPTION OF PREFERRED EMBODIMENTS OF THE INVENTION

Figure 1:
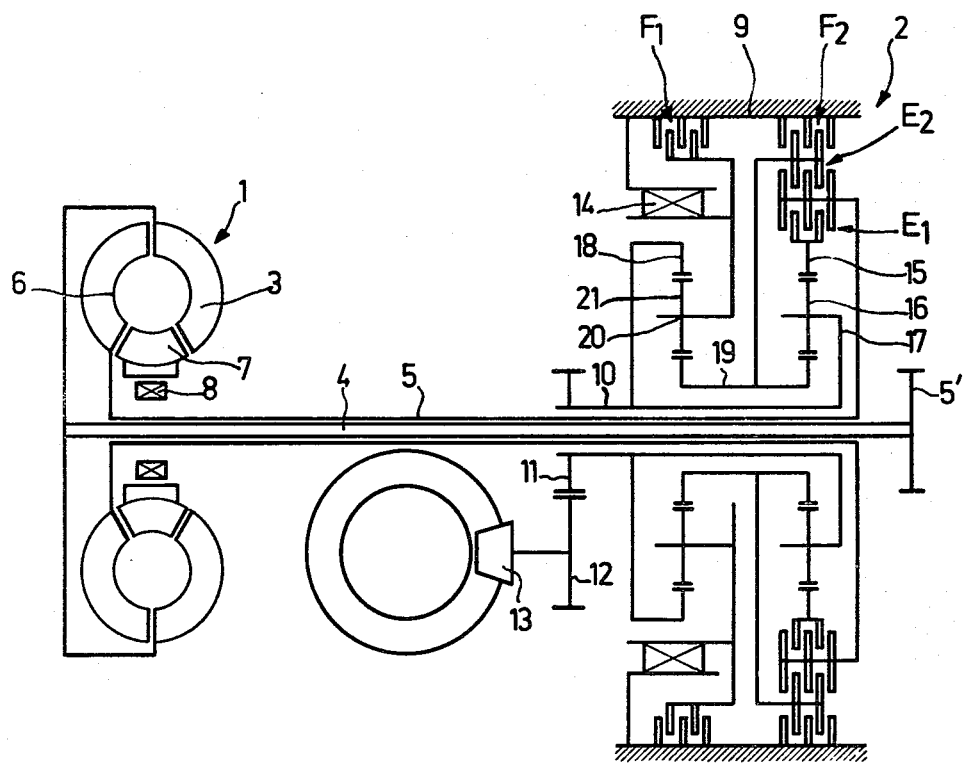
FIG. 1 is a schematic view of the main elements of an automatic transmission of the type which the device of the invention is designed to control.

An automatic transmission usable in the invention (FIG. 1)

The non-limiting example which is going to be described in detail, utilizes the automatic transmission as shown in FIG. 1. The transmission comprises a hydrokinetic torque converter 1 and an epicyclic gear train box 2. The torque converter 1 comprises three elements in the conventional manner: an impeller or pump 3 connected to the vehicle drive motor, which is not shown in the figure and which drives a gearbox service pump 5' through a shaft 4 which goes through the gearbox 2; a turbine 6, the shaft 5 of which forms the input shaft to the gearbox 2; and a stator 7 mounted by means of a freewheel system 8.

The epicyclic gear train 2 is housed in the casing 9 of the mechanism. It receives the torque from the converter 1 by means of the input shaft 5 and transmits it through an output shaft 10 and two transfer pinions 11 and 12 to a bevel gear 13 which transmits the torque to the vehicle wheels through a conventional differential.

The various transmission ratios are obtained by means of a first clutch $E_1$, a second clutch $E_2$, a first brake $F_1$, a second brake $F_2$ and a free-wheel device 14. The two clutches $E_1$ and $E_2$ and the two brakes $F_1$ and $F_2$ can be controlled hydraulically by conventional means. In practice multi-disc clutches may be used actuated by a piston receiving the oil pressure of a hydraulic fluid.

The first clutch or forward drive clutch $E_1$ transmits the torque from the shaft 5 of the turbine 6 of the converter 1, or input shaft, to a first ring gear 15 which is engaged with a first set of planet wheels 16 mounted on a first planet-carrier unit 17. The first planet-carrier 17 is mechanically linked to a second ring gear 18 and to the output shaft 10. The second clutch $E_2$ transmits the torque from the input shaft 5 to a twin sun gear 19 through the first clutch $E_1$. The first brake $F_1$ is capable of locking a second planet-carrier unit 20 carrying a second set of planet wheels 21 engaged with the second ring gear 18. The freewheel device 14 is capable of locking the second planet carrier unit 20 with respect to the casing 9 in one direction of rotation only. The second brake $F_2$ can lock the sun wheel 19 to the casing 9.

The various operational combinations of these control elements, with the additional existence of the freewheel device 14, make it possible to obtain the three forward drive ratios and the reverse ratio of the transmission.

Figure 2:
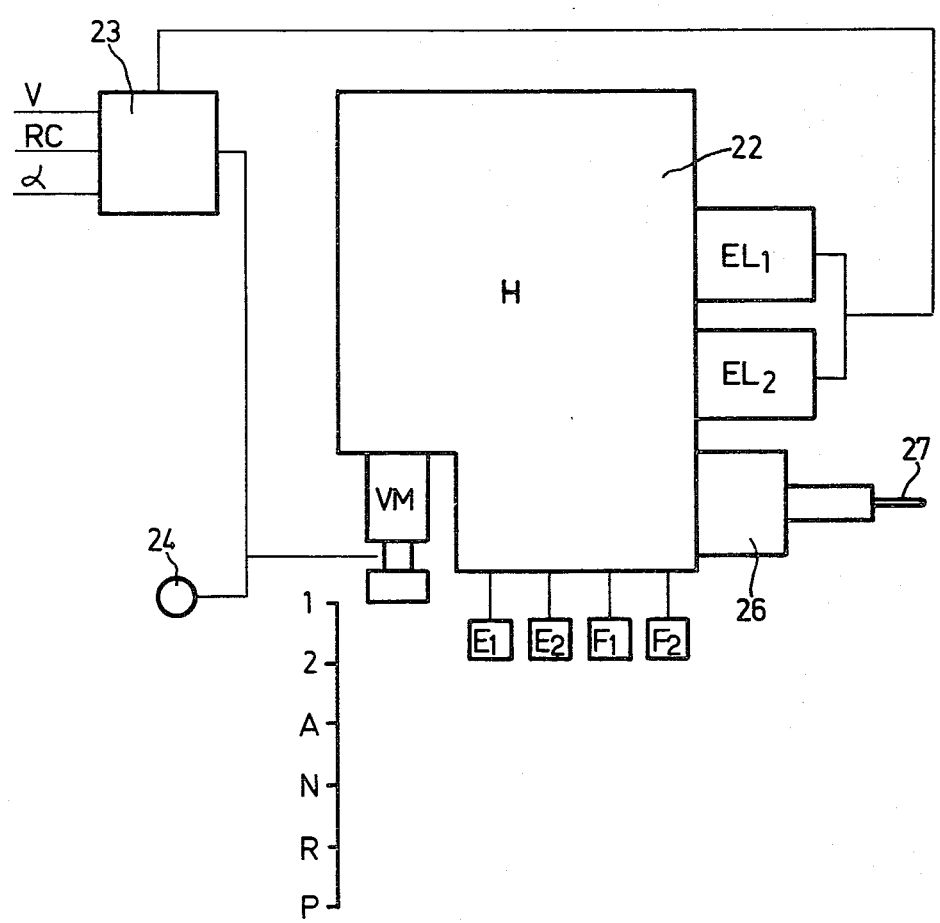
FIG. 2 is a block diagram of the mechanical part of a control device embodying the principles of the invention.
Figure 3:
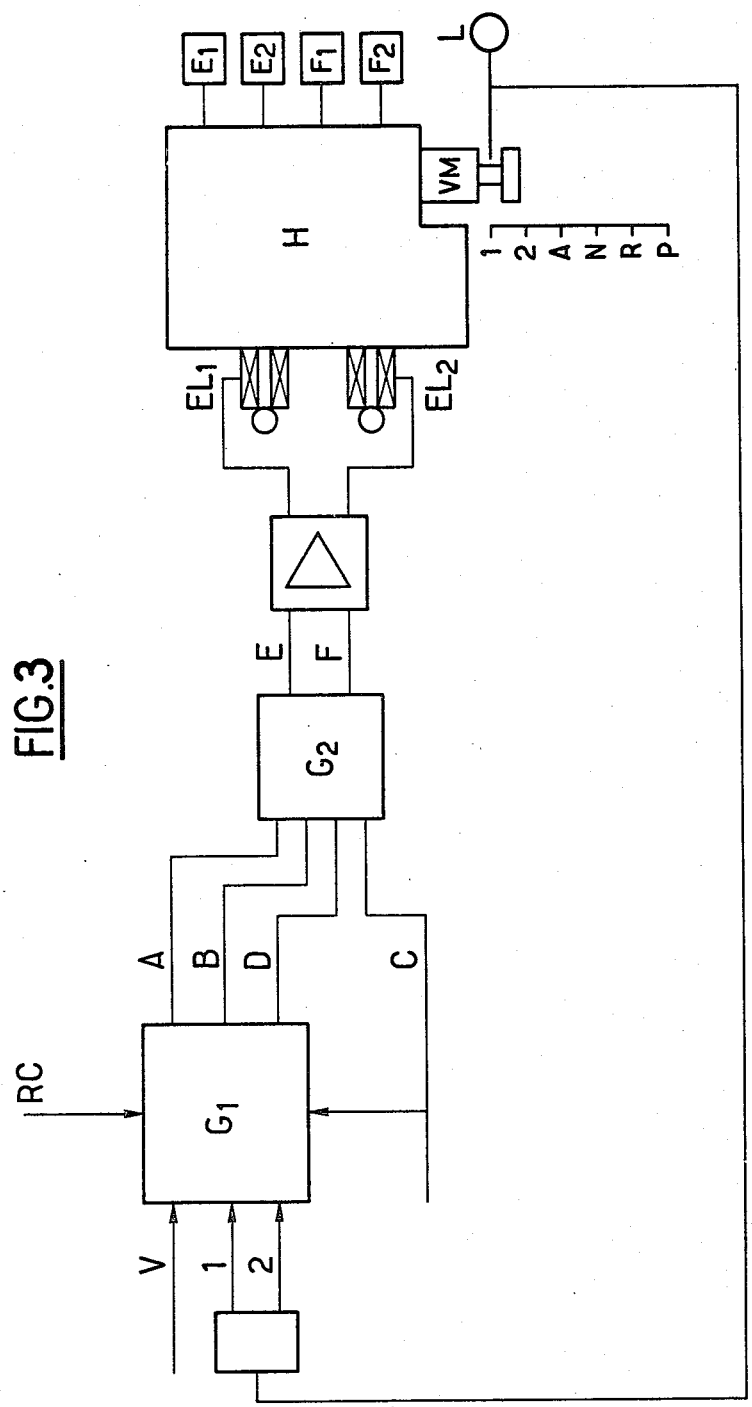
FIG. 3 is a block diagram of an entire control device embodying the principles of the invention.

A control device of the invention, considered broadly (FIGS. 2 and 3)

The main components of the mechanical part of the control device of the invention are shown schematically in FIG. 2. In this figure it can be seen that the device consists of an hydraulic distribution unit 22 or H, the output of which selectively feeds the two clutches $E_1$ and $E_2$ and the two brakes $F_1$ and $F_2$ controlling the epicyclic gear train shown in FIG. 1. The hydraulic unit 22 receives data on the running of the vehicle through an electronic device 23 normally called a comparator governor which supplies the control signals to the two electric valves $EL_1$ and $EL_2$ governing the hydraulic distribution unit 22. The comparator governor 23 receives signals corresponding to the vehicle speed V, to the drive motor load, or, which comes down to the same thing, to the position of the accelerator pedal "alpha" and also to the hard-down position of the accelerator pedal signalled by a so-called "kick-down" contact RC. The comparator governor 23 also receives a signal from the position of a selector lever 24 which is connected mechanically to a manual valve VM which also acts on the hydraulic unit 22. The manual valve VM can take up six positions:

"first imposed" position marked 1
"third prohibited" position (or "second imposed") marked 2
"automatic" position marked A
"neutral" position marked N
"reverse" position marked R
and "parking" position (or "locked stop" marked P.

A depression capsule 26 is also connected to the vehicle drive motor by means of a pipe 27 in order to modulate the pressure existing in the hydraulic circuit of the unit 22 in accordance with the depression existing in the motor intake manifold. Since this depression depends upon the motor torque the so-called line pressure existing in the hydraulic circuit also depends upon the motor torque.

The electronic unit 23 of comparator governor determines the energization state of the solenoids governing the two electric valves $EL_1$ and $EL_2$ in accordance with the state of the vehicle speed selector lever 24 and the position of the accelerator pedal. The two pilot electric valves $EL_1$ and $EL_2$ therefore each possess two states depending on whether they are electrically energized or not.

In FIG. 3 are shown all the elements of the control device of the invention and particularly the more detailed features of the governor 23. An electronic governing device $G_1$ picks up the vehicle speed V and furthermore receives some information on the state of the selector lever in positions 1 and 2 respectively corresponding to the "first imposed" and the "third prohibited" (second imposed) and on the state of the kick-down RC placed at the end of the travel of the accelerator pedal. The governor $G_1$, sends a signal A when the vehicle speed sets the change from the first transmission ratio to the second ratio and a signal B when the transmission is to change from the second to the third ratio as well as a signal D, the frequency of which corresponds to the vehicle speed V. A signal C, depending upon the position of the accelerator pedal is also supplied to the governor $G_1$. The four signals A, B, C, and D, are applied to the sequential switching device $G_2$ of this invention which transmits the output signals E and F, which, after being amplified, are directly applied to the electric valves $EL_1$ and $EL_2$.

Tabulation of the states of energization of the electric valves $EL_1$ and $EL_2$ (FIG. 4)

The table (FIG. 4) shows the state of energization of the two electric valves $EL_1$ and $EL_2$ according to the position of selector lever 24 and according to the ratio engaged for the transmission. In this table the reference 0 indicates that the solenoid of the corresponding electric valve is not electrically energized, so that the corresponding electric valve is open and lets a flow of hydraulic fluid escape. On the other hand, the symbol L indicates that the solenoid of the corresponding electric valve is electrically energized, with the valve closed and letting no hydraulic fluid pass through.

In the "automatic" A position and the "third prohibited" (second imposed) position marked 2 of the selector lever the transmission ratio change is controlled by the electronic unit 23 according to the vehicle speed and the position "alpha" of the accelerator pedal in accordance with conventional procedures for automatic gearboxes.

The hydraulic distribution unit 22 has the role of providing the selective feed of hydraulic fluid, according to the data it receives from the comparator governor 23 and from the manual valve VM, to the clutches $E_1$ and $E_2$ and the brakes $F_1$ and $F_2$ as shown in the table in FIG. 4 where the symbol O means, as before, that the corresponding receiver is not supplied with hydraulic fluid, while the symbol L means that the corresponding receiver is so supplied, the clutches then being closed and the brakes put on. It should be noted with respect to the transmission steady states that only three different states of the two electric valves $EL_1$ and $EL_2$ are used. For the positions of the selector lever P, R, N and A, when the ratio engaged is the first speed and for position 1 (first imposed), electric valve $EL_1$ is not in actual fact energized, i.e. open, while electric valve $EL_2$ is energized, i.e. closed. When the ratio engaged is the second speed the two electric valves are energized, i.e. closed. When the ratio engaged is the third speed, no electric valve is energized, so that they are both open.

According to this invention the fourth possible state of the two electric valves is used, i.e. the state in which electric valve $EL_1$ is energized, i.e. closed, and electric valve $EL_2$ is not energized, i.e. open, in order to set up a transient state corresponding to the change from the third to the second ratio and vice versa.

It should be noted that the transient states shown on the table in FIG. 4 for the changes from second to third and from third to second speeds in the automatic position of the selector lever occur again for the change of the selector lever from position 2 (third prohibited or second imposed) to the automatic position A or vice versa.

Moreover, in order to satisfy the torque tranmission in the various ratios, it is necessary to have available three different levels for the line pressure in the hydraulic circuit of unit 22: one high pressure for the reverse ratio, one intermediate pressure for the first speed and one low pressure for the second and third speed ratios. Each of these three levels is also modulated by the depression capsule 26 in accordance with the motor torque.

Structure of the hydraulic unit 22 (FIGS. 5–12)

The various components making up the hydraulic unit 22 are shown in FIGS. 5 to 12.

Figure 5:
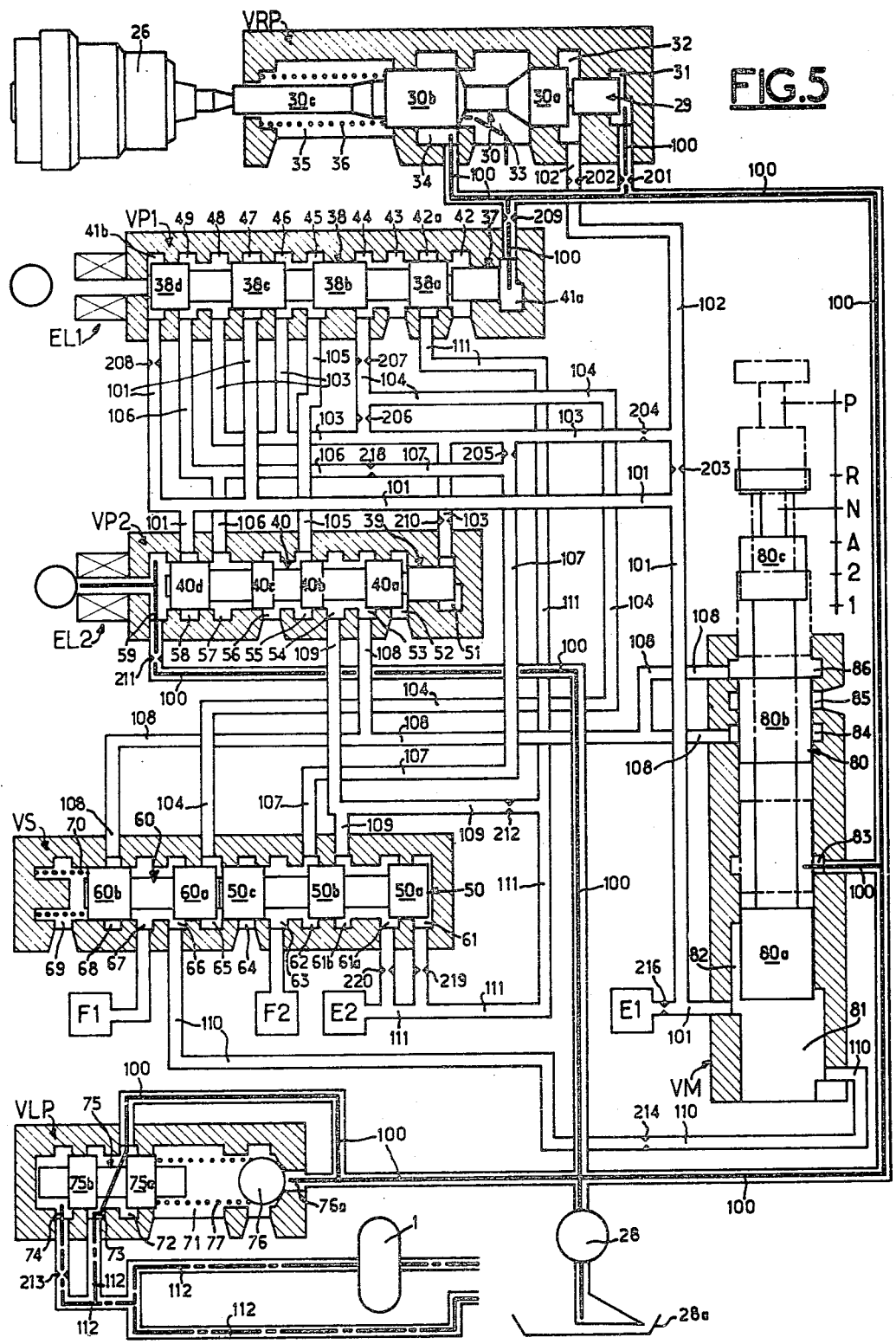
FIG. 5 is an hydraulic circuit diagram for the device of FIGS. 2 and 3, showing which of various ducts are fed with hydraulic fluid for the transmission configuration corresponding to neutral.

The structure of these various components will now be described with reference to FIG. 5. The identical structure also appears in FIGS. 6–12, where some portions are in different states or positions. The device consists essentially of two change valves marked VP1 and VP2 which are each combined with one of the above-mentioned electric valves $EL_1$ and $EL_2$, which are shown schematically in FIG. 5 by a solenoid and a ball. In actual practice, ball electric valves, as described in French Pat. No. 1,422,165 in particular, may be used. The two change valves VP1 and VP2 feed a relay valve or sequence valve VS with hydraulic fluid. The device also comprises a pressure regulating valve marked VRP and a pressure limiting valve marked VLP. The manual valve marked VM is also shown in FIG. 5. The whole of the hydraulic circuit is fed by means of a positive displacement pump 28 sucking in the hydraulic fluid from a sump 28a through a strainer.

The pressure regulating valve VRP used in the control device according to the invention may be of any type as long as it is capable of supplying the three pressure levels needed to operate the unit. In the embodiment shown in the drawings, and specifically in FIG. 5, the pressure regulating valve VRP comprises two spools 29 and 30 forming, with the body of the hydraulic distribution unit constituted by the pressure regulating valve, five chambers marked 31, 32, 33, 34, and 35, respectively, from right to left in the figure. The chambers 33 and 35 are at atmospheric pressure. The chamber 35 houses a spring 36 called the "foot up" spring. The spool 29 has only one bearing surface located between the chambers 31 and 32. The spool 30 has two bearing surfaces 30a and 30b with a cross-section exceeding the cross-section of spool 29. Owing to this difference in cross-section, the distribution spool is here made in two separate parts 29 and 30. However, it will be understood that a single spool could fulfill the same duties. The use of two spools simplifies production and makes it possible to deal with any possible misalignments. The bearing surface 30a ends in a frustoconical portion which makes it possible to provide a variable cross-section flow passage for the hydraulic fluid between the chambers 34 and 33. The spool 30 is subjected, through a rod 30c, to the action of the depression capsule 26 connected, as already mentioned, with the intake pipe of the drive motor. The "foot up" spring 36 acts on the bearing surface 30b of spool 30 in a direction which tends to move spools 30 and 29 to the right in the figures.

When the drive motor gas intake throttle is closed, the depression is a maximum on the capsule 26, which then cancels out the effect of its internal spring not shown in the figure. On the other hand, when the throttle is completely open, the depression acting upon the capsule 26 is a minimum and the effect of its internal spring adds on to that of the spring 36.

The first change valve VP1 comprises two spools 37 and 38. The spool 37, having a single bearing surface and placed in the valve body on the right in the figure, possesses a smaller cross-section than the four bearing surfaces 38a, 38b, 38c and 38d of the spool 38. Although, as before, it is perfectly possible to make spools 37 and 38 from one single machined part, it will be understood that the fact of providing two independent parts makes it possible to eliminate any difficulties in the case of a slight misalignment of the bearing surfaces. The spools 37 and 38 can only take up two positions. In the first position, the spool 38 comes into contact with the left-hand (in the figure) internal face of the body of valve VP1. In the second position, the spool 37 comes into contact, on the other hand, with the right-hand internal face of the body of valve VP1. So change valve VP1 works on the "all-or-nothing" principle.

The two spools 37 and 38 form, with the body of the distribution unit constituted by change valve VP1, eleven chambers marked from right to left 41a, 42, 42a, 43, 44, 45, 46, 47, 48, 49, and 41b. The chambers 42 and 43 are at atmospheric pressure. The left end chamber 41b is connected directly with the body of electric valve EL1 and is at atmospheric pressure when the ball of the electric valve EL1 is not attracted by the solenoid, i.e. when the electric valve EL1 is de-energized or in the open position. When the spools of the change valve VP1 are, as shown here, against the left-hand end in the figure, the chambers 43 and 44 communicate, as do the chambers 45 and 46 and the chambers 48 and 49. When the two spools 37 and 38 of the change valve VP1 are against the right-hand end in the figure (see FIG. 9, for example), the chambers 42a and 43 communicate with each other, as do the chambers 47 and 48.

The change valve VP2 also has two spools 39 and 40. The spool 39 is fitted in the body of valve VP2 at the right-hand end in the figure, and it comprises a single bearing surface with a smaller cross-section than that of the four bearing surfaces 40a, 40b, 40c, and 40d of the spool 40. As before, the two-plate construction of the two spools 39 and 40 facilitates assembly and allows certain misalignment to be neglected. Spools 39 and 40 can also occupy two positions only, either on the left or on the right, with the change valve VP2 working on the "all-or-nothing" principle like the change valve VP1. The change valve VP2 is combined with the electric valve $EL_2$, which is identical to the electric valve $EL_1$, and which allows the movements of spools 39 and 40 to be hydraulically controlled.

The spools 39 and 40 form, with the body of the distribution unit formed by change valve VP2, nine chambers marked from right to left 51, 52, 53, 54, 55, 56, 57, 58, and 59. The chambers 52 and 56 are at atmospheric pressure. The left-hand end chamber 59 communicates directly with the central duct of the electric valve $EL_2$ so that the chamber 59 is at atmospheric pressure when the ball of the electric valve $EL_2$ is not attracted by its solenoid, i.e. when the said electric valve $EL_2$ is not energized and is thus in the open position.

When the two spools 39 and 40 are right up against the left-hand end (see FIG. 9, for example) the chambers 54 and 55 communicate with each other, as do the chambers 57 and 58. When the two spools 39 and 40 are against the right-hand end, on the other hand, as shown in FIG. 5, the chambers 53 and 54 communicate as do the chambers 55 and 56.

It should be noted that the two change valves VP1 and VP2 are governed completely hydraulically by operation of the electric valves $EL_1$ and $EL_2$ only, these valves allowing fluid to escape or not. The various spools of the two change valves are not acted upon by any springs, which considerably simplifies their assembly and operation. Furthermore, it will be noted that the various spools are all symmetrical, so that they can be fitted in either direction alternately, which makes it possible to simplify the assembly operations, it no longer being necessary to check the orientation of the spools during these operations.

The relay valve or sequence valve VS has two independent spools 50 and 60. The spool 50 is located in the right-hand section of the valve body and has three bearing surfaces of identical cross-section 50a, 50b, and 50c. The spool 60 is located in the left-hand section of the valve body and has two bearing surfaces 60a and 60b with the same cross-section as the bearing surfaces of the spool 50.

The two spools 50 and 60 form, with the body of the distribution unit constituted by relay valve VS, eleven chambers marked from right to left in the figure: 61, 61a, 61b, 62, 63, 64, 65, 66, 67, 68, and 69. A spring 70 acts upon the bearing surface 60b and pushes the two spools 60 and 50 back to the right. The spring 70 applies a force which is only slightly greater than the friction force of the two spools 50 and 60 in the body of valve VS for the tightest fit produced in manufacture.

The chambers 64 and 69 are connected to atmospheric pressure, and the chamber 69 is located at the extreme left of the valve body which accommodates the spring 70. The separation between the spools 50 and 60 is located in the chamber 65, the intermediate chamber.

When the spools 50 and 60 are against the left-hand end (see FIG. 6, for example) the chambers 63 and 64 communicate, as do the chambers 67 and 68. On the contrary, when the spools 50 and 60 are against the right-hand end (see FIG. 5, for example) the chambers 62 and 63 communicate, as do the chambers 66 and 67 and the chambers 61*a* and 61*b*. When the spools 50 and 60 are spaced from each other (see FIG. 8, for example), which constitutes their third possible state, with the spool 50 against the right-hand end and the spool 60 against the left-hand end working against the force of the spring 70, the chambers 61*a* and 61*b* communicate, as do the chambers 62 and 63. Moreover, the chambers 67 and 68 also communicate.

The pressure limiting valve marked VLP may also be of a conventional type. Its function is to limit the pressure in the hydraulic circuit and also to feed and regulate the transmission lubrication circuit as well as the gearbox torque converter. In the embodiment shown in the figures, the pressure limiting valve VLP comprises a spool 75 provided with two bearing surfaces 75*a* and 75*b* with the same cross-section, forming, with the body of the distribution unit constituted by valve VLP, four chambers marked from right to left in the figure: 71, 72, 73, and 74. The chamber 71 is at atmospheric pressure, and it houses a helical spring 77 which bears against a ball 76 at one end and against the bearing surface 75*a* of the spool 75 at the other. The function of the ball 76 is to close off a port 76*a*. When spool 75 is against the left-hand end, the chamber 72 and 73 communicate.

The manual valve VM has a spool 80 provided with three bearing surfaces of the same diameter 80*a*, 80*b*, and 80*c* forming, with the body of the distribution unit constituted by the manual valve VM, six chambers marked from bottom to top in the figure: 81, 82, 83, 84, 85, and 86. The chamber 85 is connected to atmospheric pressure. The manual valve can take up the six positions corresponding to the six positions of the control selector 24, which can be seen in FIG. 2 and which is linked to it mechanically.

Figure 12:
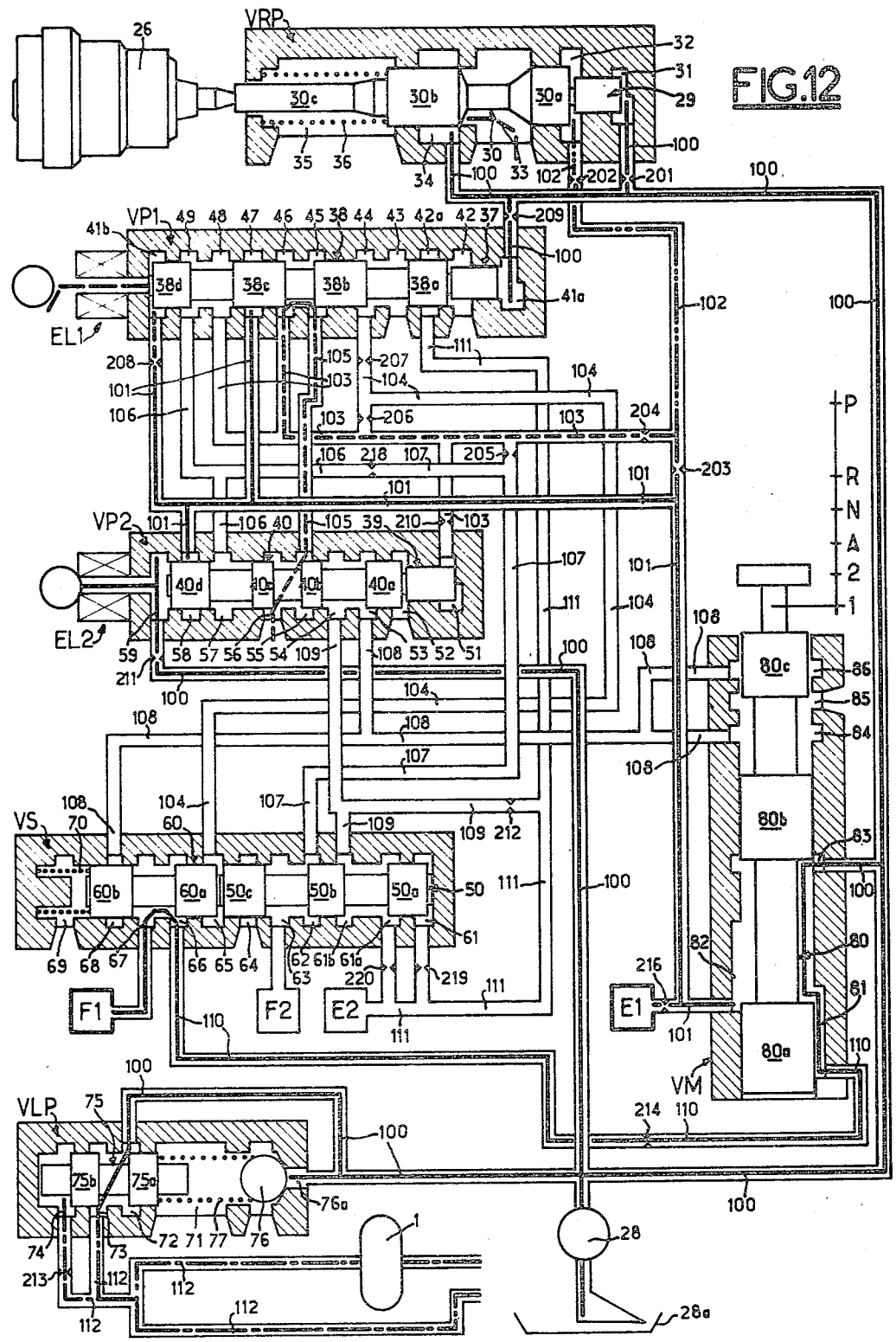
FIG. 12 is a view similar to FIG. 5 and illustrates the state of the transmission corresponding to the first speed imposed by the driver.

In position 1, i.e. the bottommost in FIG. 12, the chambers 81, 82, and 83 communicate, as do the chambers 84 and 85.

In position 2, the chambers 82 and 83 communicate as do the chambers 84, 85, and 86. In position A (FIG. 7), the chambers 82 and 83 communicate, as do the chambers 85 and 86. In position N (FIG. 5), the chambers 81 and 82 communicate. In position R (FIG. 6), the chambers 81 and 82 communicate, as do chambers 83 and 84. In position P (FIG. 5), the chambers 81 and 82 communicate as do chambers 84, 85, and 86.

The various ducts connecting the various valves together and with the receiving components will now be described.

The chambers 31 and 34 of the pressure regulating valve VRP are connected with a duct 100 bringing the hydraulic fluid from the positive displacement pump 28. In the duct 100, upstream of chamber 31 at the right-hand end of valve VRP, there is a damping nozzle 201. The chamber 32 is connected to a duct 102 through a nozzle 202.

When the end chamber 31 is at the line pressure, the force acting upon the spool 29 balances out the combined forces of the spring 36 and the capsule 26: this gives a first high pressure level.

When the end chamber 31 and the intermediate chamber 32 are both at the line pressure, the forces exerted on the spool 29 and the bearing surface 30*a* of spool 30 balance out the combined forces of spring 36 and capsule 26; a second low pressure level is thereby obtained.

In order to set up an additional intermediate pressure level, a first nozzle 203 is installed in a duct 101, which can be connected with the line pressure through the manual valve VM, and a second nozzle 204 is provided in a duct 103, which can be connected on the one hand with the atmospheric pressure by means of the change valves VP1 and VP2 and also with the duct 101 downstream of the nozzle 203. The intermediate pressure existing between the two nozzles 203 and 204, when an escape flow exists in the duct 103 situated downstream, is applied through the duct 102 to the chamber 32. When the end chamber 31 is at the line pressure and the intermediate chamber 32 at this intermediate pressure, the combined forces of these two pressures on the spool 29 and on the bearing surface 30*a* of the spool 30 balance out the combined forces of spring 36 and capsule 26; and a third pressure level is obtained which is intermediate between the high and low pressure levels.

The right-hand end chamber 41*a* of the change valve VP1 is connected to the duct 100 through a nozzle 209. The chamber 42*a* is connected with the duct 111 which is itself connected directly with the second clutch $E_2$. The chamber 44 is connected with a duct 104 through a nozzle 207 and with the duct 103 through nozzles 207 and 206 placed in series. The chamber 45 is connected with a duct 105. The chambers 46 and 48 are connected with the duct 103. The chamber 47 is connected with the duct 101. The chamber 49 is connected with the duct 106, and finally the left-hand end chamber 41*b* is connected with the duct 101 through a nozzle 208.

The chamber 51 at the right-hand end of the change valve VP2 is connected with the duct 103 through a nozzle 210. The chamber 53 is connected with a duct 108. The chamber 54 is connected with a duct 109, which is connected by a nozzle 212 to the duct 111. The chamber 55 is connected with the duct 105. The chamber 57 is connected with the duct 106. The chamber 58 is connected with the duct 101 and finally the left-hand end chamber 59 is connected with the duct 100 through a nozzle 211.

The right-hand end chamber 61 of the relay valve VS is connected with the duct 111 through a nozzle 219. The chamber 61*a* is connected with the duct 111 and with the second clutch $E_2$ through a nozzle 220. The chamber 61*b* is connected with the duct 109; the chamber 62 is connected with a duct 107, which is connected by a nozzle 205 to the duct 103 and by a nozzle 218 to the duct 106; the chamber 63 is directly connected with the second brake $F_2$; the chamber 65 is connected with the duct 104; the chamber 66 is connected with a duct 110; the chamber 67 is directly connected with the first brake $F_1$; and the chamber 68 is connected with the duct 108.

The chamber 72 of the pressure limiting valve VLP, and also its port 76*a*, which can be closed by a ball 76, are connected with the feed duct 100. The chamber 73 is connected with a duct 112 which also feeds the circuit of the transmission converter 1 as well as the lubrication circuit. The chamber 74 is connected with the duct 112 through a nozzle 213.

The chamber 81 of the manual valve VM is connected with the duct 110 through a nozzle 214. The chamber 82 is connected directly with the duct 101 and through a nozzle 216 to the forward drive clutch $E_1$. The chamber 83 is connected with the duct 100. The chambers 84 and 86 are connected with the duct 108.

Operation of the device of FIGS. 5-12

Operation of the device will now be described for the various positions of the selector lever controlling the manual valve and for the various transmission ratios.

Referring first to FIG. 5, the spool 80 of the manual valve VM has been shown by a chain line in the P position of the speed selector and by a continuous line for the N position.

In the P position, when the vehicle drive motor is running and driving the pump 28, the duct 100 fills up with hydraulic fluid. The chambers 31 and 34 of the pressure regulating valve VRP fill up, and the value of the pressure existing in the duct 100 depends upon the setpoint provided by the spring 36, the depression capsule 26, and the cross-section of the spool 29. The pressure in the chamber 31 causes the spool 30 to move and results in a fluid flow, which is determined by the relative position of the bearing surface 30b with respect to the chambers 33 and 34, the chamber 33 being at atmospheric pressure and the chamber 34 being fed by the duct 100. The pressure regulating valve VRP supplies a pressure level in the duct 100 which corresponds to the high pressure required for the reverse drive.

The duct 100 also feeds the chamber 72 of the pressure limiting valve VLP and the port 76a. The pressure existing in the duct 112 then depends upon the spring 77 and the cross-sectional area of the bearing surface 75b of the spool 75 on which the pressure existing in the chamber 74 is exerted. If the pressure in the duct 100 rises excessively, due to faulty operation of the hydraulic circuit as a whole, the ball 76 is forced off its seat and acts as a safety valve by allowing a fluid leakage through the inlet 76a of the pressure limiting valve VLP. In this position of the speed selector, the manual valve VM is in position P. The spools 37 and 38 of the change valve VP1 are against the left-hand end, since the solenoid of the valve $EL_1$ is de-energized, with the corresponding electric valve being open, as can be seen in FIG. 5. The right-hand end chamber 41a of the change valve VP1 is fed by the duct 100, thus pushing the two spools 37 and 38 back to the left.

The two spools 39 and 40 of the change valve VP2 are against the right-hand end, since the solenoid of the electric valve $EL_2$ is energized and the valve closed, as can be seen in FIG. 5. The chamber 59 is fed through the duct 100 so that the two spools 39 and 40 are pushed back to the right. The ducts 101, 102, 103, 104, 105, 106, 107, 108, 109, 110, and 111 are at zero (or atmospheric) pressure. The chamber 61 of the relay valve VS is also at zero, and the spools 50 and 60 are against the right-hand end pushed by spring 70; so the clutch $E_2$ is also at zero. The brake $F_2$ is at zero through chambers 62 and 63 of the relay valve VS. The brake $F_1$ is at zero through the chambers 66 and 67 of the relay valve VS, and the clutch $E_1$ is at zero through the chamber 82 of the manual valve VM. Under these conditions, none of the clutches or brakes is engaged, and the transmission is in the neutral configuration. In FIG. 5, thick continuous lines show the ducts which are fed with hydraulic fluid at the line pressure. The thick broken lines or chain lines conventionally show the hydraulic fluid at a pressure less than the line pressure.

Figure 6:
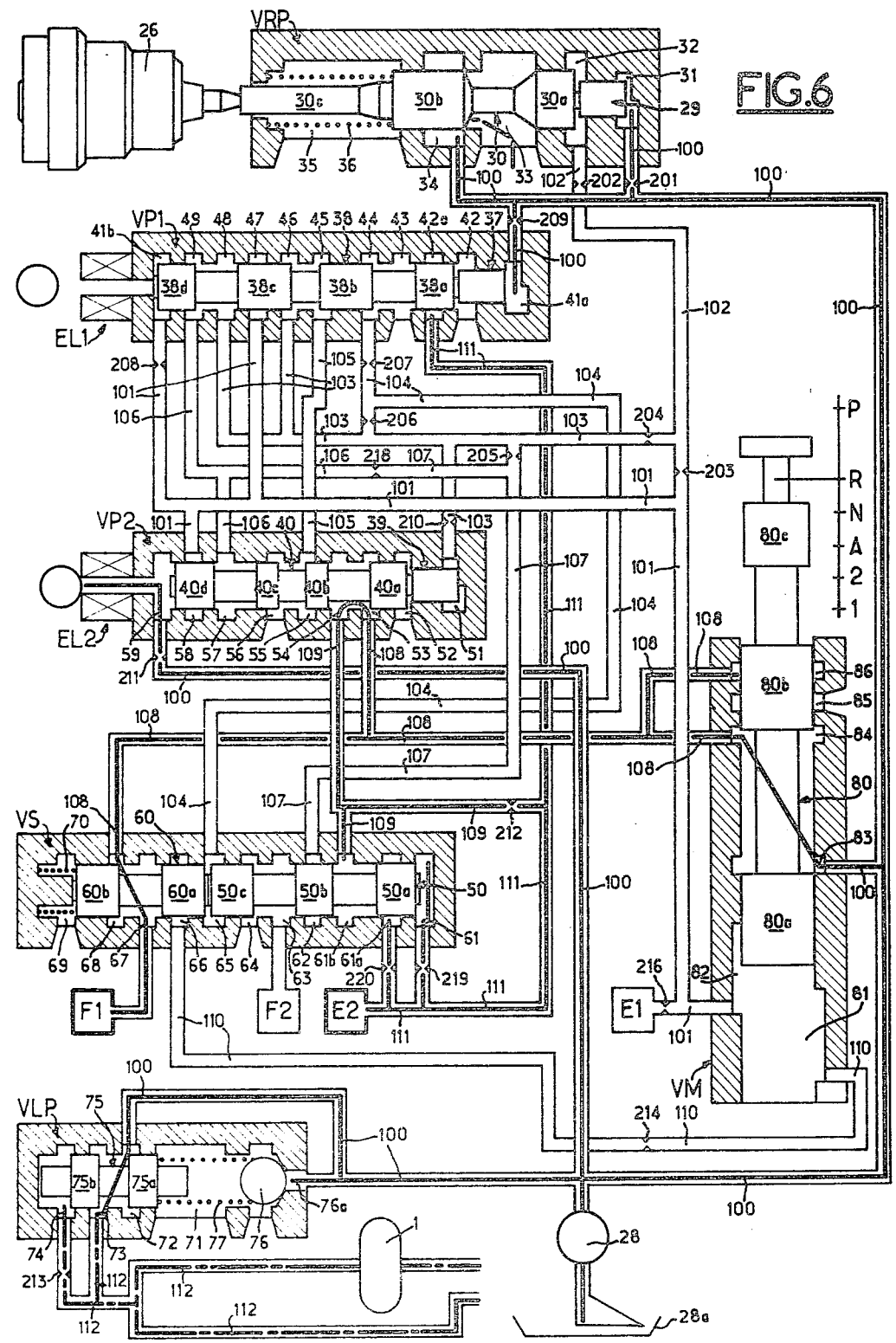
FIG. 6 is a view similar to FIG. 5 for the transmission configuration showing the ducts fed with fluid in the state corresponding to the reverse drive ratio.

The change from the P position to the R position of the manual valve is carried out in the following way:

The electric valves $EL_1$ and $EL_2$ remain in the same state for position P; the change valves VP1 and VP2 therefore remain in the same position, as can be seen in FIG. 6.

In position R of the manual valve VM, the ducts 100 and 108 communicate through the chambers 83 and 84. The duct 108 feeds the chambers 53 and 54 of the change valve VP2, and the duct 109 fills with fluid. The clutch $E_2$ starts being fed from the duct 109 via the chambers 61b and 61a of the relay valve VS through the nozzle 220 and also via the duct 111 through the nozzle 212. It is the pressure rise in this clutch $E_2$ that will control the feed to the brake $F_1$. Thus, the chamber 61 of the relay valve VS fills with fluid, and, for a certain pressure level in this chamber, the spools 50 and 60 move to the left, as shown in FIG. 6, which makes it possible to feed the brake $F_1$ from the duct 108 via the chambers 67 and 68 of the relay valve VS. From this time on, the clutch $E_2$ is fed only through the nozzle 212, since the chambers 61b and 61a do not communicate any longer. The result of this is that the clutch $E_2$ fills up more slowly at the end of the filling process than before. It should be noted that no nozzle is provided on the feed duct 108 of the brake $F_1$, so that the brake $F_1$ is filled more rapidly than the clutch $E_2$ owing to the existence of the nozzles 212 and 220. Now, since the brake $F_1$ used for reverse drive must absorb considerable reaction forces, it has a bigger capacity than the clutch $E_2$; the fact that the change to the reverse drive ratio is completed with the lower capacity receiver makes it possible to limit the effect of any shock.

When both the clutch $E_2$ and the brake $F_1$ are fed, the transmission is in the reverse drive configuration. The brake $F_2$ is at zero through the chambers 63 and 64 of the relay valve VS. The clutch $E_1$ is at zero through chamber 82 of the manual valve VM.

With reference to FIG. 5 again, the continuous line shows the position of the manual valve VM when the speed selector is in the N position.

When changing from the reverse drive R to the N position, the electric valves $EL_1$ and $EL_2$ remain in the same state as in "Parking" and "Reverse." The change valves VP1 and VP2 also remain in the same position. The ducts 101, 108, and 110 are at zero through chambers 82, 86, and 81 of the manual valve VM. The duct 109 is at zero through the chambers 54 and 53 of the change valve VP2. The duct 111 is at zero and allows the clutch $E_2$ and the chamber 61 of the relay valve VS to be emptied. When the pressure in the chamber 61 of the said relay valve drops sufficiently, the spring 70 pushes the two spools 60 and 50 back against the right-hand end and the brake $F_1$ empties through the chambers 67 and 66 of the relay valve VS and the duct 110. The brake $F_2$ is at zero through the chambers 63 and 62 of the relay valve VS, the duct 107, and the duct 106, through chambers 49 and 48 of the change valve VP1 followed by the duct 103, the ducts 102 and 101 and the chamber 82 of the manual valve VM. The clutch $E_1$ is at zero through the chamber 82 of the manual valve VM. The line pressure level supplied by the pressure regulating valve VRP is always the high pressure needed for the reverse drive, and the gearbox is in the neutral configuration.

Figure 7:
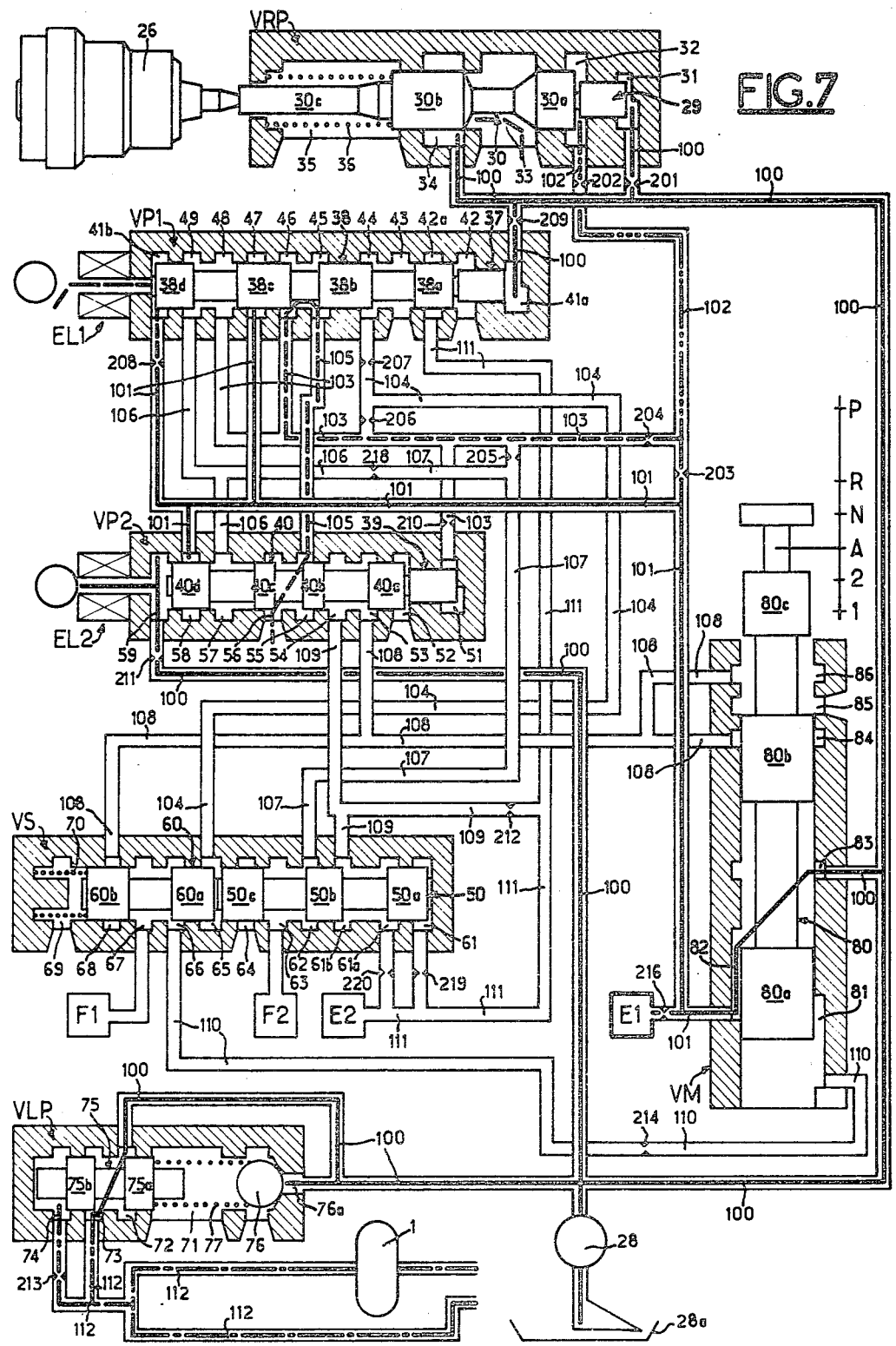
FIG. 7 is a view similar to FIG. 5 showing the transmission configuration corresponding to the first forward drive ratio.

FIG. 7 illustrates the hydraulic fluid circuit for position A of the manual valve VM in the case of the first speed ratio being engaged. The position A of the manual valve VM corresponds to forward drive operation with automatic gear-changing over the three transmission ratios. The solenoids of the two electric valves $EL_1$ and $EL_2$ are controlled by the comparator governor 23 in FIG. 2, and their state depends upon the vehicle speed and the position of the accelerator pedal. When the vehicle is stopped, the electric valves $EL_1$ and $EL_2$ are always in the same configuration as for the "Parking", "Reverse", and "Neutral" positions, and the change valves VP1 and VP2 remain in the same state as in FIGS. 5 and 6. In the "Automatic" position shown in FIG. 7, the chambers 82 and 83 of the manual valve VM communicate so that the duct 101 fills with fluid, and the clutch $E_1$, the forward drive clutch, is fed from the duct 101 through the nozzle 216. The duct 102 is filled with fluid from the duct 101 through the nozzle 203 and the duct 103 is fed with fluid from the duct 102 through the nozzle 204. The duct 103 can be emptied through the chambers 46 and 45 of the change valve VP1, the duct 105, and the chambers 55 and 56 of the change valve VP2, which communicate with atmospheric pressure. So a flow is set up through the nozzles 203 and 204, and an intermediate pressure level between the pressure existing in the duct 101 and the zero pressure existing in the duct 103 appears in the duct 102 and the chamber 32 of the pressure-regulating valve VRP. This valve VRP is balanced by the action of the line pressure existing in the chamber 31, by the action of the intermediate pressure existing in chamber 32 and by the action of the spring 36 and the depression capsule 26. The pressure-regulating valve VRP delivers as the line pressure a middle pressure level, which is required for the transmission's first speed ratio.

The duct 103 brings the duct 107 to zero through the chambers 49 and 48 of the change valve VP1. The duct 104 is at zero through the chambers 44 and 43 of the change valve VP1. The line pressure which was already existing in the chamber 41a is established in the chamber 47 of the change valve VP1. The duct 108 is at zero through the chambers 86 and 85 of the manual valve VM. The ducts 109 and 111 are at zero through the chambers 54 and 53 of the change valve VP2 and duct 108. The duct 110 is at zero through the chamber 81 of the manual valve VM. The two spools 50 and 60 of the relay valve VS are against the right-hand end through the action of the spring 70.

Only the drive clutch $E_1$ is fed, and the transmission is in the first speed configuration. In this configuration the ring gear 15 (FIG. 1) is in fact driven by the turbine shaft 5. The reaction of the epicyclic train acts on the freewheel 14 which is locked by the planet carrier 20. The planet carrier 17 and the ring gear 18 transmit the torque to the output shaft 10.

Figure 8:
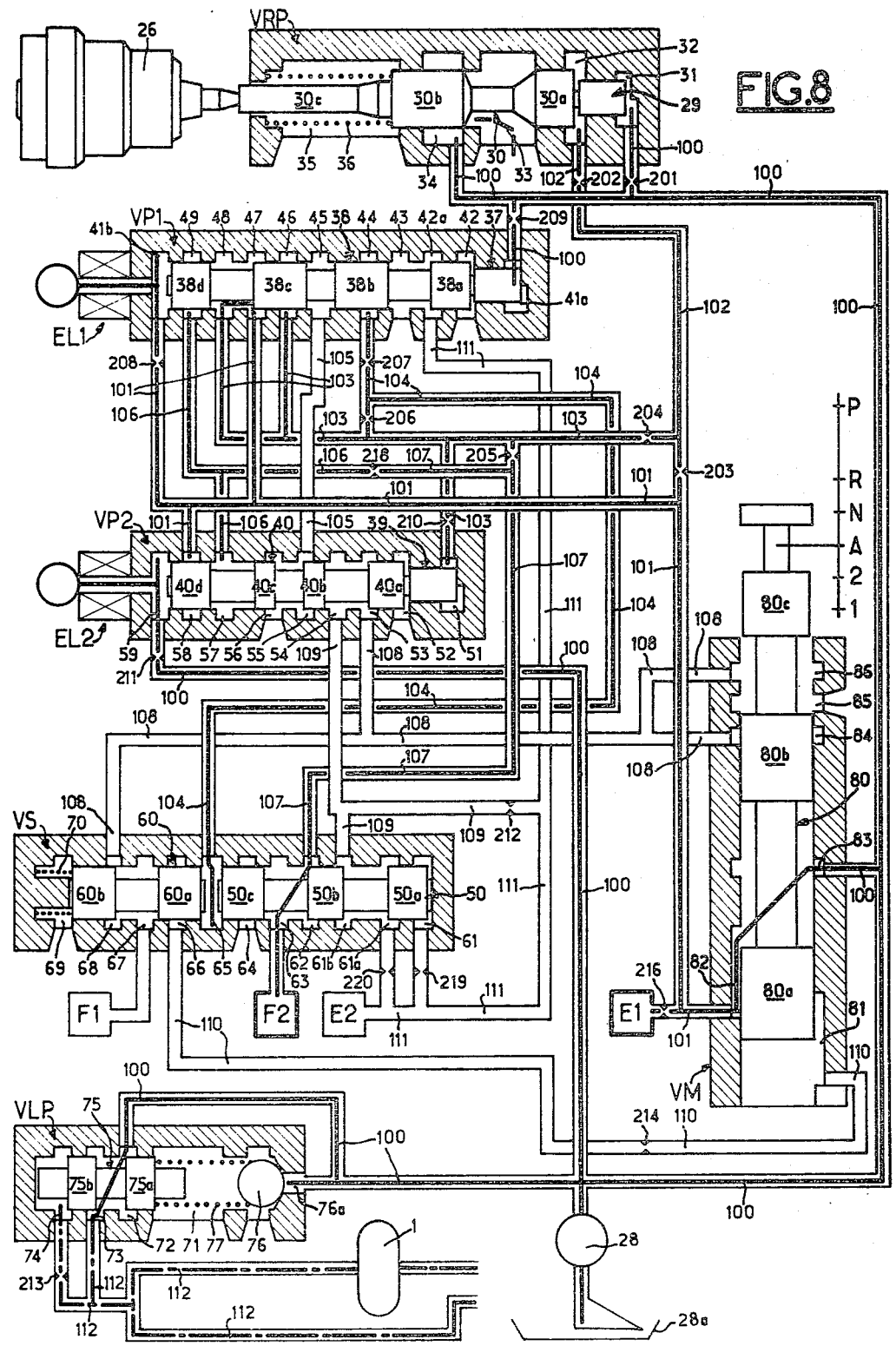
FIG. 8 is a view similar to FIG. 5 showing the transmission configuration corresponding to the steady state of the second transmission ratio.

FIG. 8 shows the flow of the hydraulic fluid for the steady state of the second speed ratio. When the vehicle speed increases and/or the motor load increases, the governor 23 (FIG. 2) gives the order to energize the solenoid of the electric valve $EL_1$, so that the two electric valves $EL_1$ and $EL_2$ are closed as shown in FIG. 8. The left-hand end chamber 41b of the change valve VP1 fills with fluid, which, owing to the larger cross-section of the bearing surface 38d compared with the cross-section of the spool 37, causes the spools 38 and 37 to move over to the right to the position shown in FIG. 8. In this new position of the change valve VP1, the zero connection of the duct 103, which was made through the chambers 46 and 45 and the duct 105, is blocked. The pressure existing in the duct 102 and the chamber 32 of the pressure-regulating valve VRP becomes the pressure supplied by the pump 28. In fact, there is no flow any longer between the two nozzles 203 and 204, and the same pressure applies in the ducts 101, 102, and 103. The pressure-regulating valve VRP is balanced by the action of the pressure existing in the chamber 32, the force of the spring 36, and the action of the depression capsule 26. The pressure level is established at the low level required for the second and third speed ratios.

The duct 101 feeds the chambers 47 and 48 of the change valve VP1, and the line pressure is also established in the duct 103. The brake $F_2$ is fed through the nozzle 205, which limits the rate of filling through the duct 107 and the chambers 62 and 63 of the relay valve VS.

The forward drive clutch $E_1$ remains fed, and the brake $F_2$ is locked. Since the clutch $E_2$ and the brake $F_1$ are still empty, the transmission is in a second speed ratio configuration.

The duct 104 is fed from the duct 103 at line pressure, and the intermediate chamber 65 of the relay valve VS is subjected to the line pressure. Under these conditions, the spool 50 remains at the right-hand end, while the spool 60 moves until it abuts on the left-hand end against the force of the spring 70. It will be seen later that this intermediate state of the relay valve VS will be used for the change to the third speed ratio.

Referring to FIG. 1 it will be seen that, in this configuration, with the clutch $E_1$ engaged, the input to the epicyclic train occurs through the first ring gear 15 and the output through the first planet carrier 17 and the second ring gear 18. The putting on of the brake $F_2$, which should happen gradually, locks the sun gear 19 to the casing 9. The sun gear 19, which was in fact rotated for the first speed, must be completely stopped to obtain the second ratio.

Figure 9:
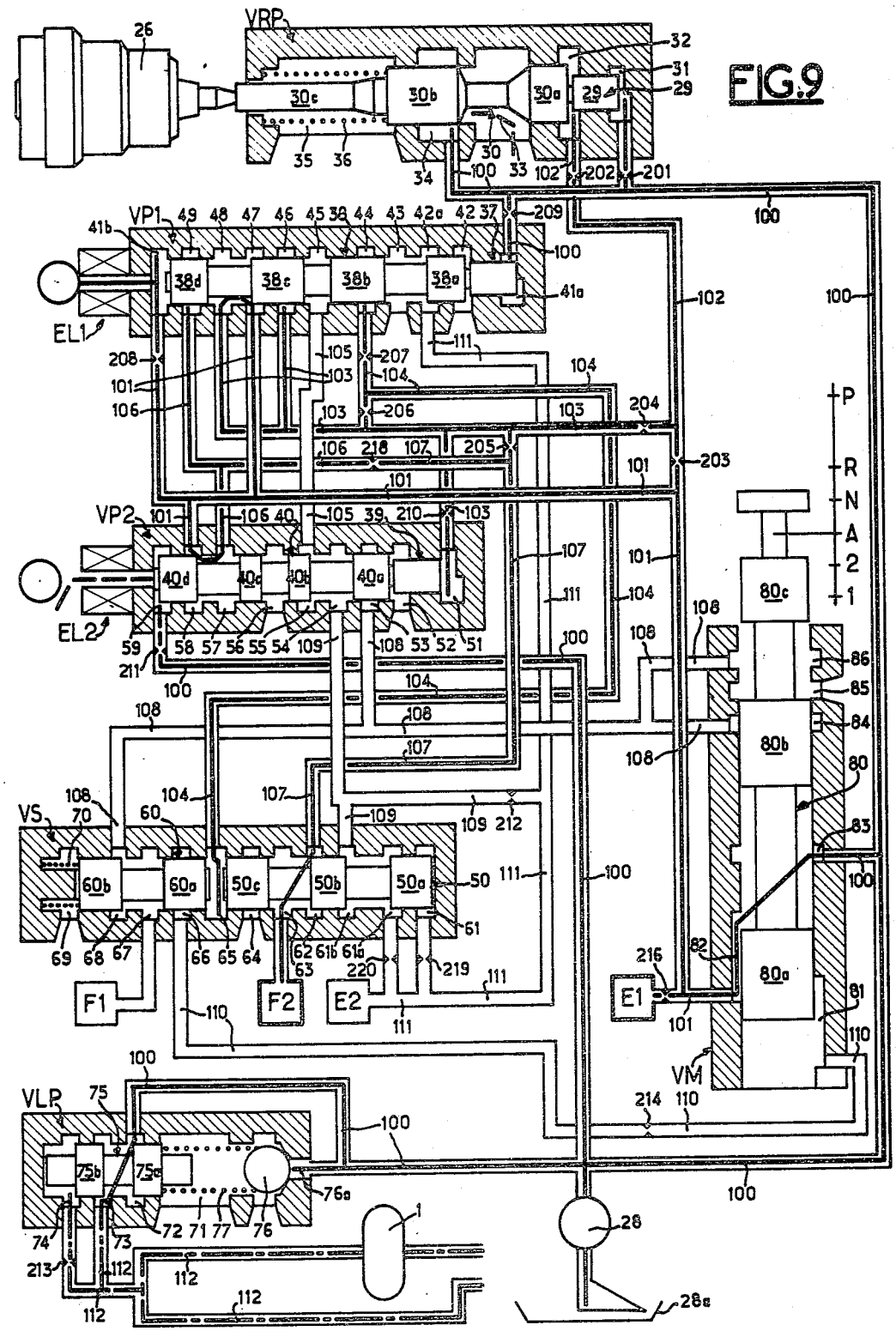
FIG. 9 is a view similar to FIG. 5 and illustrates the state of the transmission corresponding to the transient change from the second to the third ratio.

FIG. 9 illustrates the flow of fluid in the transient state corresponding to the change from the second to the third speed. When the vehicle speed increases and/or the motor load increases, the order to change to the third ratio is given by the governor 23 (FIG. 2). In a first stage (corresponding to the transient state in FIG. 9), the solenoid of the electric valve $EL_2$ is de-energized, which opens this electric valve $EL_2$, thus bringing the left-hand end chamber 59 of the change valve VP2 to atmospheric pressure so that its spools 39 and 40 abut on the left end. The ducts 101 and 106 are connected through the chambers 57 and 58 of the change valve VP2. The duct 107 is therefore fed through the nozzle 218, which has a bigger cross-sectional area than the nozzle 205, and the brake $F_2$ remains on. Because of this, the transmission is still in a second speed ratio configuration. It should be noted that the change from the second to the third speed is performed through this transient state in which the electric valve $EL_2$ is open while the electric valve $EL_1$ remains closed. The configuration in which the electric valve $EL_1$ is open and the electric valve $EL_2$ closed, would in fact correspond to the first speed. It should also be noted that, in this transient configuration, as shown in FIG. 9, the intermediate chamber 65 of the relay valve VS is still subjected to the line pressure so that the spool 50 goes on abutting on the right-hand end and the spool 60 on the left-hand end.

Figure 10:
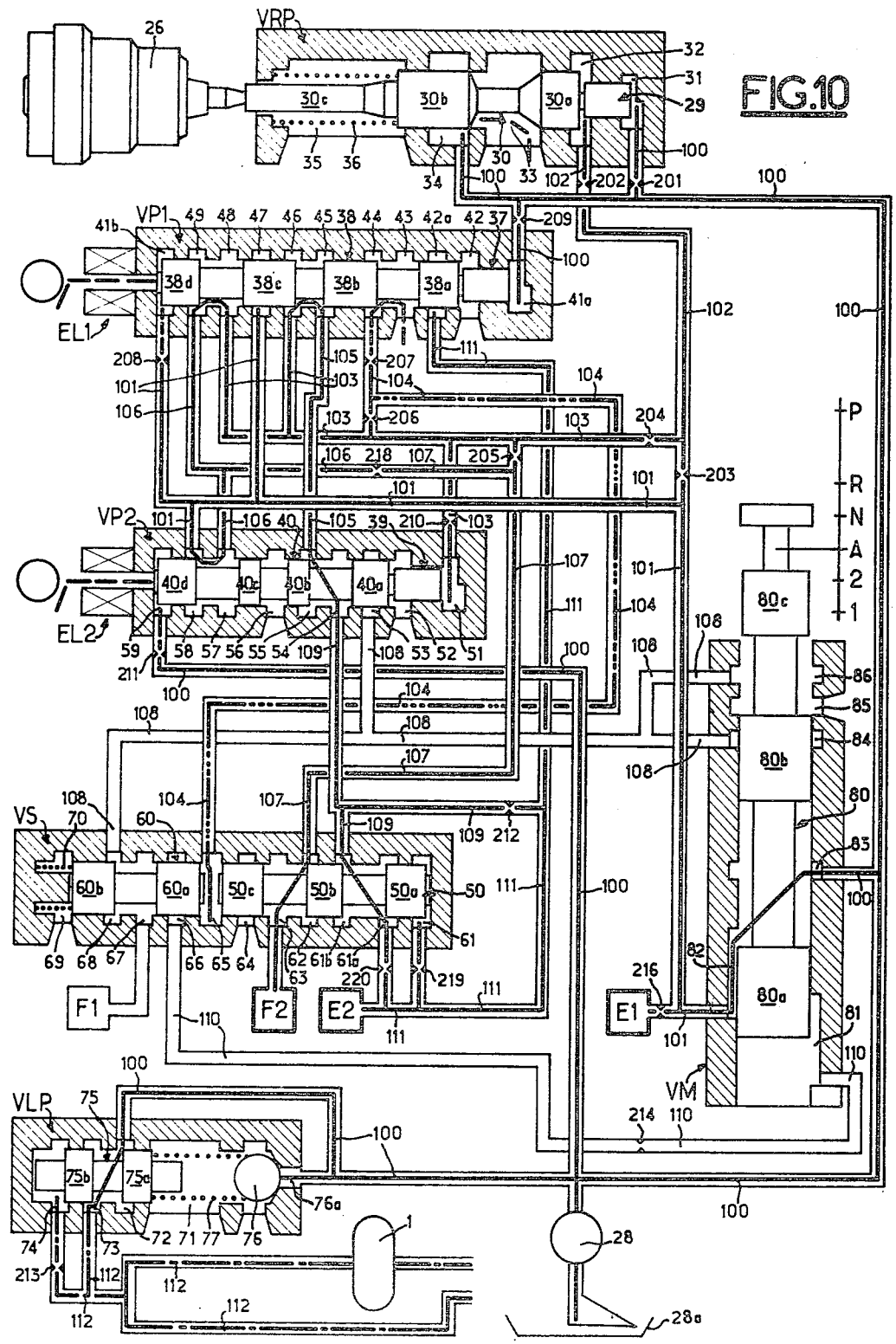
FIG. 10 is a view similar to FIG. 5 and illustrates the state of the transmission corresponding to the second phase of the transient change between the second and the third ratios.

After this transient period, the very short constant duration of which is fixed by the governor 23, the latter cuts off the current supply to the solenoid of the electric valve $EL_1$ which opens. In this configuration, shown in FIG. 10, both electric valves $EL_1$ and $EL_2$ are open. Since the left-hand end chamber 41b of the change valve VP1 is connected with the atmosphere, the two spools 37 and 38 abut on the left-hand end under the action of the line pressure existing in the right-hand end chamber 41a. The chambers 43 and 44 communicate and enable fluid to escape from the duct 103 through the nozzles 206 and 207 in series. An intermediate pressure is established between these two nozzles and appears in the duct 104. This intermediate pressure or cut-off pressure is established in the intermediate chamber 65 of the relay valve VS. The intermediate cut-off pressure is shown in FIG. 10 by a thick chain line.

Figure 11:
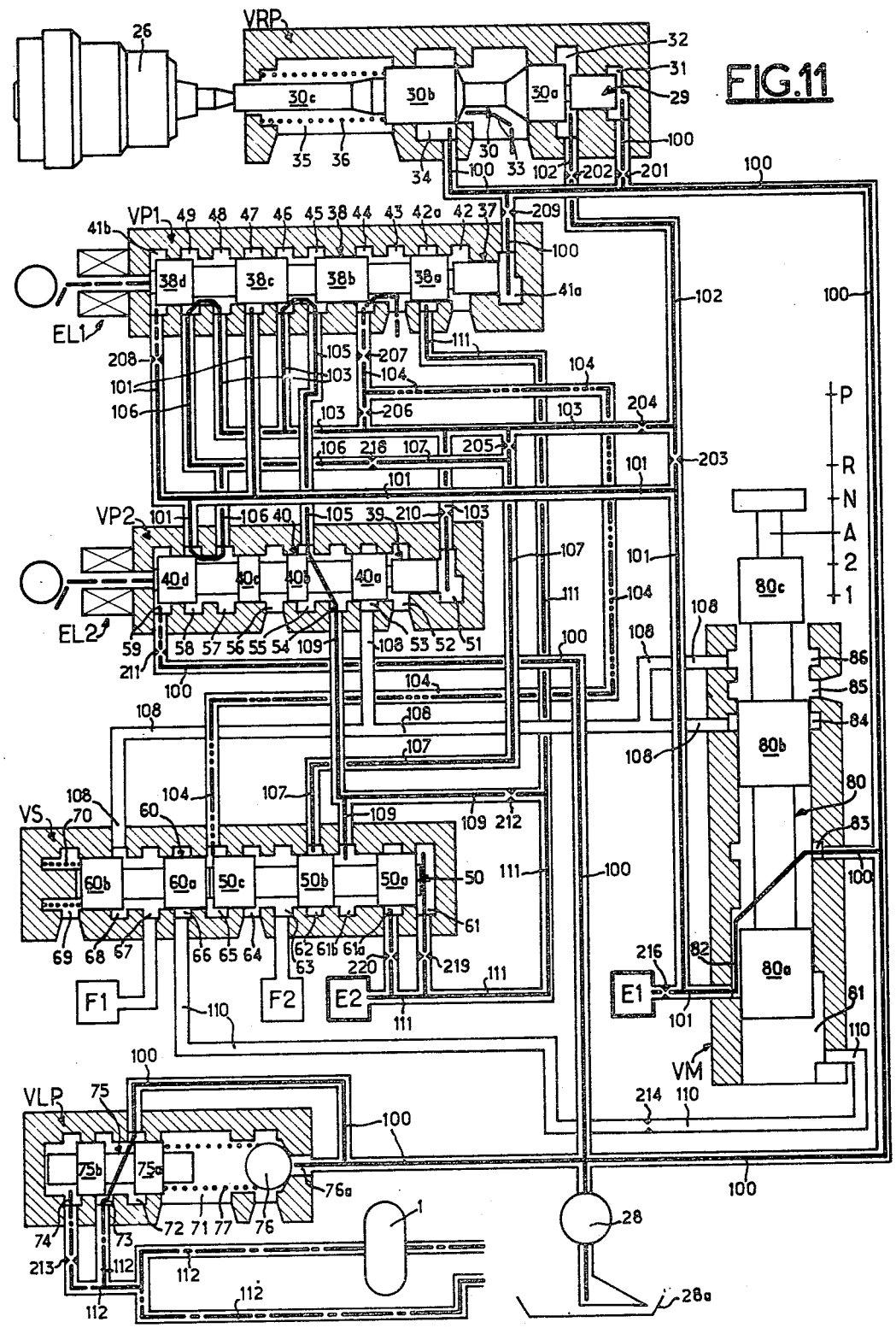
FIG. 11 is a view similar to FIG. 5 and illustrates the state of the transmission corresponding to the third ratio.

The chambers 46 and 45 of the change valve VP1 are filled with fluid from the duct 103, and the clutch $E_2$ also fills up from the duct 105, the chambers 55 and 54 of the change valve VP2, the duct 109, the nozzle 212, and the duct 111. The clutch $E_2$ also fills through the chambers 61b and 61a of the relay valve VS, the nozzle 220, and the duct 111. In this transient state, as shown in FIG. 10, the forward drive clutch $E_1$ is still filled and the brake $F_2$, also filled, is still on, so that the transmission is still in the second ratio. In addition, the clutch $E_2$ begins to fill. The pressure existing in the clutch $E_2$ is gradually established through the nozzle 219 in the right-hand end chamber 61 of the relay valve VS. For a certain filling level of this clutch the pressure in the chamber 61 rises higher than the cut-off pressure or set-point pressure existing in the intermediate chamber 65. From this time the spool 50 moves over to the left, thus setting the chambers 63 and 64 at zero and emptying the brake $F_2$. The clutch $E_2$ continues to fill, but more slowly, through the nozzle 212 only and the duct 111. When the clutch $E_2$ is completely filled, the third speed configuration is produced as shown in FIG. 11.

In this configuration, since the clutches $E_1$ and $E_2$ are filled, the epicyclic train is locked. The first ring gear 15 rotates at the speed of the turbine, and the sun gear 19 rotates at the same speed.

It can be seen that the relay valve VS has a cut-off function between the clutch $E_2$ and the brake $F_2$ owing to the existence of the intermediate chamber 65 separating the two spools 50 and 60. Thus, when the pressure existing in the clutch $E_2$ gets lower than the set pressure in the intermediate chamber 65, the spool 50 moves over to the right, which causes the brake $F_2$ to be fed. On the other hand, when the pressure in the clutch $E_2$ gets higher than the set pressure, the spool 50 moves over to the left (as has just been explained) and presses against the spool 60 which was already abutting on the left owing to the pressure existing in the intermediate chamber 65. In this configuration the brake $F_2$ is no longer fed and is discharged to the tank. It is finally the pressure variation in the clutch $E_2$ compared with a set pressure existing in the intermediate chamber 65 of the relay valve VS which cuts off or feeds the brake $F_2$.

Moreover, referring to FIG. 6 for the reverse drive configuration, it has been seen that the relay valve also had the function of simultaneously feeding the clutch $E_2$ and the brake $F_1$. In this case, in which the intermediate chamber 65 is not fed and the two spools 50 and 60 are in contact, it is in fact a slight rise in pressure in the clutch $E_2$ which causes the two spools 50 and 60 to move to the left-hand end of the body of the relay valve VS, thus enabling the brake $F_1$ to be fed. This slight over-pressure is enough to push the low-force spring 70 back and to overcome the friction on the spools.

When the transmission is in the third speed configuration, as shown in FIG. 11, and the driver wishes, for example, to overtake and pass another car, he fully depresses the accelerator pedal and, in order to provide the vehicle with the maximum acceleration, the electronic device 23 gives the transmission the order to change down to second speed. This requires the clutch $E_2$ to be emptied, the brake $F_2$ to be put on and the transient state in FIG. 9 to be gone through. The duration for which this transient state is maintained is very important because it conditions the quality of the gear change.

Three cases may occur in practice. In the first case, the driver depresses the accelerator pedal, and the vehicle speed is high. In this case, the synchronism speed of the motor is high and it is necessary, in order to change down from third to second speed, to give the motor time to race to reach the synchronism speed. Since the motor speed at the beginning of the change is relatively low, enough time should be left to the motor to reach this synchronism speed.

In the second case, the driver still depresses the accelerator pedal but the vehicle is moving at low speed. This means that the synchronism speed is low and that a time shorter than before is enough for the motor to reach the synchronism speed.

In the third case, the driver does not depress the accelerator pedal. This is the so-called "Foot Up" position, and the vehicle is moving at relatively low speed. The synchronism speed of the motor is low and the speed difference is small, as in the previous case. However, the rise in motor speed is only provided by the vehicle's kinetic energy which may drive the motor as soon as the brake $F_2$ starts being put on. It should be noted that the vehicle's kinetic energy is relatively low since it is travelling at low speed and that the motor is being fed at a low rate. In this third case, it is therefore necessary to give the motor a relatively long period to reach the synchronism speed.

The total change time, which varies, as has just been seen, according to the vehicle speed and to whether the driver depresses the accelerator pedal or not, corresponds to the total duration for which the brake $F_2$ is fed. The control device of the invention makes it possible to achieve a filling time for the brake $F_2$ which is longer at high vehicle speeds than at low vehicle speeds. With this object, the device of the invention uses the fourth state of the two electric valves $EL_1$ and $EL_2$, as shown in FIG. 9, in which the energized electric valve $EL_1$ is closed and the de-energized electric valve $EL_2$ is open. This transient state corresponds to a first period of the change down from third to second speed. As soon as the change down command is given, the electronic device 23 supplies a command energizing the electric valve $EL_1$ which closes, while the electric valve $EL_2$ remains open. The spools 37 and 38 of the change valve VP1 therefore abut on the right-hand end. The chambers 43 and 44 no longer communicate, and the flow which escaped through the nozzles 206 and 207 (FIG. 11) becomes zero. Thereby, the line pressure is established in the duct 104 and in the intermediate chamber 65 of the relay valve VS. Moreover, the duct 111 is made to communicate through the chamber 42a with the chamber 43, at atmospheric pressure, of the change valve VP1, thus enabling the clutch $E_2$ to be emptied through the ducts 105, 109, and 111. As soon as the emptying of the clutch $E_2$ begins, the pressure in the right-hand end chamber 61 of the relay valve falls. Under the effect of the line pressure existing in the intermediate chamber 65, the spool 50 of the valve VS moves over to the right, enabling the brake $F_2$ to be fed through the chambers 63 and 62 of the relay valve VS, the duct 107, the nozzle 218, the duct 106, the chambers 57 and 58 of the change valve VP2, and the duct 101, which is at the line pressure. The brake $F_2$ is also fed through the nozzle 205, the duct 103, the chambers 47 and 48 of the change valve VP1, and the duct 101.

According to the invention, the cross-sectional area of the opening left by the restriction formed by the nozzle 218 is bigger than the cross-sectional area of the opening left by the restriction formed by the nozzle 205 connecting the duct 107 to the duct 103. Under these conditions, the brake $F_2$ is fed in this transient state at high speed through the large opening in the nozzle 218 at the same time as through the small opening in nozzle 205.

After a period during which the transient state is maintained and which is determined appropriately by the electronic device 23 according to the vehicle speed and according to whether the driver depresses the accelerator pedal or not, the governor 23 gives the command to energize the electric valve $EL_2$. The flow of fluid which was shown in FIG. 9 becomes the flow shown in FIG. 8. In this position, the two spools of the change valve VP2 are at the right-hand end and the chambers 57 and 58 which allow the brake $F_2$ to be fed at high speed through the large opening in the restrictor 218 no longer communicate. Thereby, the duct 107 can no longer be fed directly by the duct 101 and the nozzle 218 but is only fed by the duct 103 through the nozzle 205, the cross-section of which is smaller as has just been explained. In this position, therefore, the brake $F_2$ is fed at low rate. When the brake $F_2$ is completely filled and the clutch $E_2$ is completely emptied, the transmission is in the second speed ratio configuration. Thanks to this two-state change, it becomes possible to get the brake $F_2$ to be applied at the exact moment when the motor reaches the synchronism speed.

The change down from third speed to second speed is performed in the same way, using the selector lever which moves the manual valve VM from position A to position 2. In this configuration, in fact, the manual valve VM does not change the fluid flow as shown in FIGS. 9 and 8. Here again, the vehicle speed, and also the fact of whether the driver depresses the accelerator pedal or not, are taken into account in order to determine the time for which the first transient phase of the change is maintained.

Figure 13:
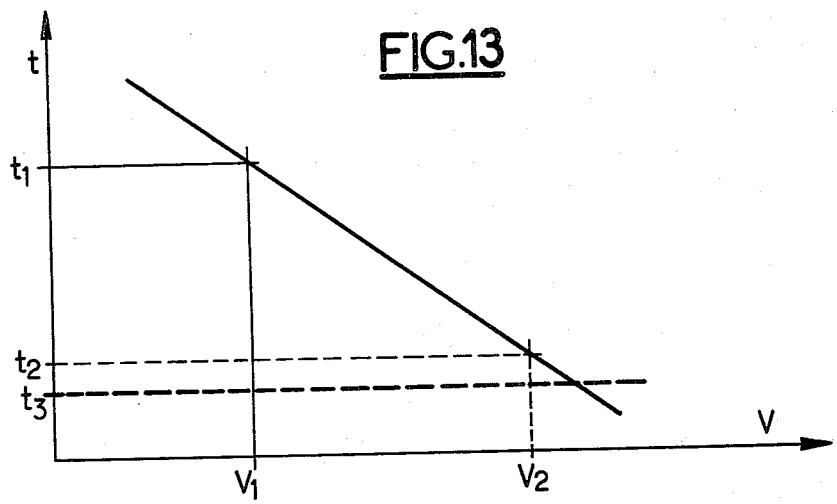
FIG. 13 is a graph showing the duration of the time delay plotted against vehicle speed.
Figure 14:
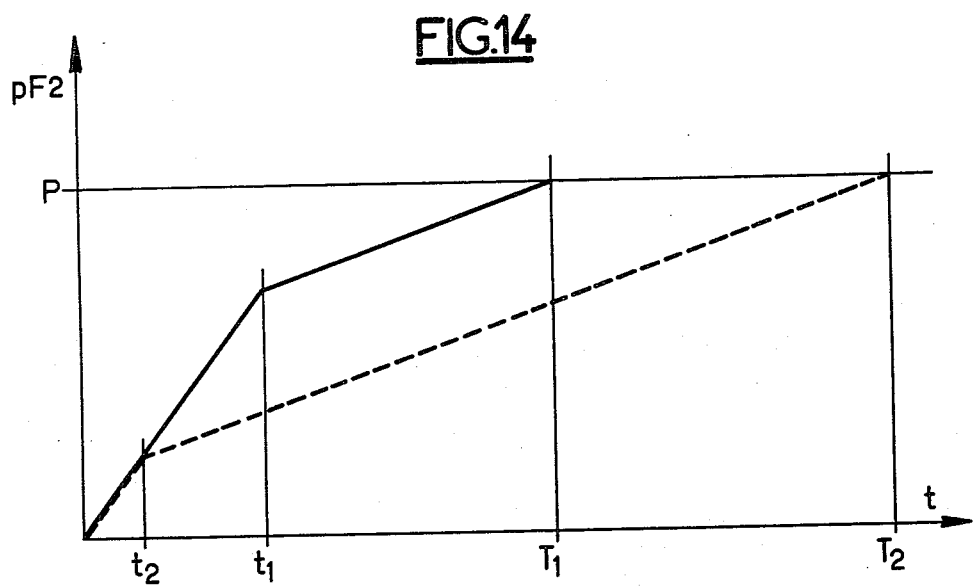
FIG. 14 is a graph showing the variation in pressure in the brake used for the second ratio plotted against time.

FIGS. 13 and 14 illustrate the selection of the duration of the transient state for the change down from third to second speed. The continuous line graph shows the duration of the transient state t plotted against the vehicle speed V. The broken line, which is here a horizontal straight line, given as an example, supplies a time $t_3$ corresponding to the case when the accelerator pedal is not depressed. If the vehicle has a speed $V_1$ it can be seen that the duration of the transient state defined by the governing electronic device 23 is $t_1$. With reference to FIG. 14, which shows how $pF_2$, the pressure in the brake $F_2$, varies with time (t), it can be seen that this pressure increases rapidly along a straight line, shown by a continuous line, until time $t_1$. This rapid increase corresponds to the transient state as shown in FIG. 9., i.e. to a rapid feed to the brake $F_2$ through the wide opening nozzle 218 at the same time as through the nozzle 205. After time $t_1$ the configuration of the hydraulic circuit is that shown in FIG. 8, with the pressure in the brake $F_2$ only increasing slowly until it reaches the filling pressure P at time $T_1$.

For a speed $V_2$ higher than that shown in FIG. 13, it can be seen that the total duration of the transient state is shorter and equal to $t_2$. The curve corresponding to the pressure in the brake $F_2$, shown by a dashed line in FIG. 14, shows that the shorter duration $t_2$ of the high speed feed to the brake $F_2$ brings about a total feed time $T_2$ longer than $T_1$.

So finally, in the case when the driver depresses the accelerator pedal, a third to second speed change-down time is obtained which is longer when the vehicle speed is higher thus enabling the motor to reach the synchronism speed and providing a smooth change from one ratio to the other. For all the drive motor partial loads up to the "Fully Depressed Pedal" position, the curve in FIG. 13 is followed. It should be noted that this curve, which is in fact a straight line with a negative gradient, can also be replaced by approximation by an upper plateau and a lower plateau defining two values only for the duration of the transient state.

If the driver does not depress the accelerator pedal, the governor 23 imposes the use of the dashed line curve providing a short time delay $t_3$ in order to ensure a long change time enabling the vehicle to bring the motor to the synchronism speed.

The change down from second speed to first speed is performed as follows. When the governor 23 in FIG. 2 gives the command to change down to the first speed, the solenoid of the electric valve $EL_1$ is de-energized. The spools of the change valve VP1 abut on the left-hand end as shown in the FIG. 7. The chambers 45 and 46 of the change valve VP1 communicate, and the duct 13 is brought to zero by the duct 105 and the chambers 55 and 56 at the atmospheric pressure of the change valve VP2. A fluid flow escapes through the series nozzles 203 and 204, so that the pressure regulating valve VRP establishes the line pressure at the intermediate level necessary for the first speed. Since the duct 103 is at zero, the duct 104 also comes to zero, as does the intermediate chamber 65 of the relay valve, the spool 60 of which moves to the right under the effect of the spring 70 and thus comes into contact with the spool 50. The duct 107 is also brought to zero through the duct 106, the chambers 49 and 48 of the change valve VP1 and the duct 103. In this manner, the brake $F_2$ can be emptied through the chambers 63 and 62 of the relay valve VS and the duct 107. When the brake $F_2$ is completely emptied, the transmission is in the first configuration, as shown in FIG. 7.

The speed lever also makes it possible to place the manual valve in a position marked 1 which is called the "First Imposed" position. In this case, which is shown in FIG. 12, it can be seen that the manual valve VM connects the chambers 83, 82, and 81 and thus, through the duct 110 and the nozzle 214, feeds the chambers 66 and 67 of the relay valve VS which, in this configuration, communicate since the two spools 50 and 60 abut on the right-hand end. The brake $F_1$ is then fed, and this improves the reaction on the epicyclic train in contrast with the first speed configuration in position A when the reaction occurred through the free-wheel 14.

Although, in the embodiment described as an example, two separate change valves were used, it will be understood that it would be possible to device configurations only using one change valve controlled by the two electric valves $EL_1$ and $EL_2$ in order to obtain the same states of the control device.

The sequential switching device (FIG. 15)

The sequential switching device, the simplified diagram of which is shown in FIG. 15, makes it possible to define the signals E and F, for the control of the two electric valves $EL_1$ and $EL_2$. It should be noted that these signals can be either high or low, with the low signal corresponding to the energized state of the associated electric valve and the high signal to the de-energized state.

The signals A, B, E, and F can only assume two levels respectively, corresponding to the value "0" near the zero voltage and to the value "1" near a reference voltage, with transition edges from the low level to the high level and/or from the high level to the low level, which are very short in relation to the period of variation of the signals considered. The signal C is an analog voltage corresponding to the position of the accelerator pedal, the amplitude of which varies with time. The signal D is also an analog voltage, the frequency of which depends upon the vehicle speed and varies with time. As shown in FIG. 15, the input signals A and B are changed through a first processing unit 1001 and a second processing unit 1002 which each receive both signals A and B. The first processing unit 1001 supplies the output signal E for the control of the first electric valve $EL_1$, shown in FIGS. 2 and 3, with a constant time delay ($\Delta t_1$). The second processing unit 1002 receives, not only the signals A and B, but also the output from a voltage level detector 1003 fed with the signal C, and the output from a frequency detector 1004 fed with the signal D. The processing unit 1002 finally generates an output signal F, for the control of the second electric valve $EL_2$, with a variable time delay ($\Delta t_2$) the duration of which depends on the signals C and D.

The time variation of the voltages of the different signals is shown in FIG. 16. The signal E is at the high level when the signals A and B are both high; the signal E is at the low level when the signal A is at the low level and the signal B at the high level. The signal E remains at the low level for a constant time $\Delta t_1$ counted from the trailing edge (high level towards the low level) of the signal B when the signal A is at the low level. The signal E chages rapidly into the high value while the signals A and B remain at the low level.

The signal F is at the high level when the signal B is at the low level. It remains at the high level for a time $\Delta t_2$ counted from the leading edge (low level towards the high level) of the signal B. The time $\Delta t_2$ varies with the voltage of the signal C which acts through the voltage level detector 1003, and with the frequency of the signal D, which acts through the frequency detector 1004 shown in FIG. 15. The signal F changes rapidly into the low value while the signal A is low and the signal B is high. The high level of the signal A sets the low level of the signal F, as can be seen on the dashed curve in FIG. 16.

It should be noted that the change of the signal A from the high level to the low level corresponds to the change from the first transmission ratio to the second. The change of the signal B from the high level to the low level corresponds to the change from the second ratio to the third ratio. Under these conditions from 0 to $t_1$ in FIG. 16, the transmission is placed on the first speed ratio; from the time $t_1$ to the time $t_2$, the hydraulic control device is in a configuration which corresponds to the steady state of the second speed ratio. During the time $\Delta t_1$, i.e. from $t_2$ to $t_3$, upon changing from the second to the third speed ratio, the hydraulic control device monitored by the two electric valves $EL_1$ and $EL_2$ in their fourth state is in a configuration which corresponds to the transient state. From the time $t_3$ to the time $t_4$, the hydraulic control device is in a configuration which corresponds to the third speed ratio. For the time $\Delta t_2$, i.e. from $t_4$ to $t_5$, the two electric valves, $EL_1$ and $EL_2$, are in the fourth state which corresponds to the transient state of the change from the third to the second speed. From the time $t_5$ to the time $t_6$ the second speed again is applied and, finally, beyond $t_6$, the transmission is again in the configuration of the first speed. It should also be noted that the signal B cannot be low when the signal A is already low, the change from the second to the third speed being possible indeed only if the change from the first to the second speed has already been performed. Also, the low level of the signal B is always longer than the constant time delay $\Delta t_1$ which is generally less than 20 milliseconds.

One embodiment of a control circuit (FIGS. 17-22)

In the embodiment of FIG. 17, the signal E is created by a ramp generator 1005 receiving the input signals A and B, and by a voltage comparator 1006 with a fixed threshold, $U_1$, which performs the logic combination of the input signals A and B of the processing unit 1001 of FIG. 15 and carries out the $\Delta t_1$ time delay function. The signal F is obtained by a linear ramp generator 1007 receiving the complement to the signal B (i.e. $\bar{B}$) and the slope control coming from the voltage comparator 1009 with a fixed threshold $U_2$ which detects the voltage level of the signal C and by a voltage comparator 1008 with a variable threshold receiving the output signal of the ramp generator 1007, the signal A, the signal B, and the threshold voltage varying in relation to the frequency of the signal D, which comes from the frequency to voltage converter 1010. This arrangement enables the functions of the processing unit 1002 in FIG. 15 to be performed, i.e. the logic combination of the input signals A and B, by providing the time delay $\Delta t_2$, which gives a time varying discontinuously with the voltage level of the signal C and continuously with the frequency of the signal D, as shown on the curve in FIG. 22, which is almost identical with FIG. 13.

Figure 18:
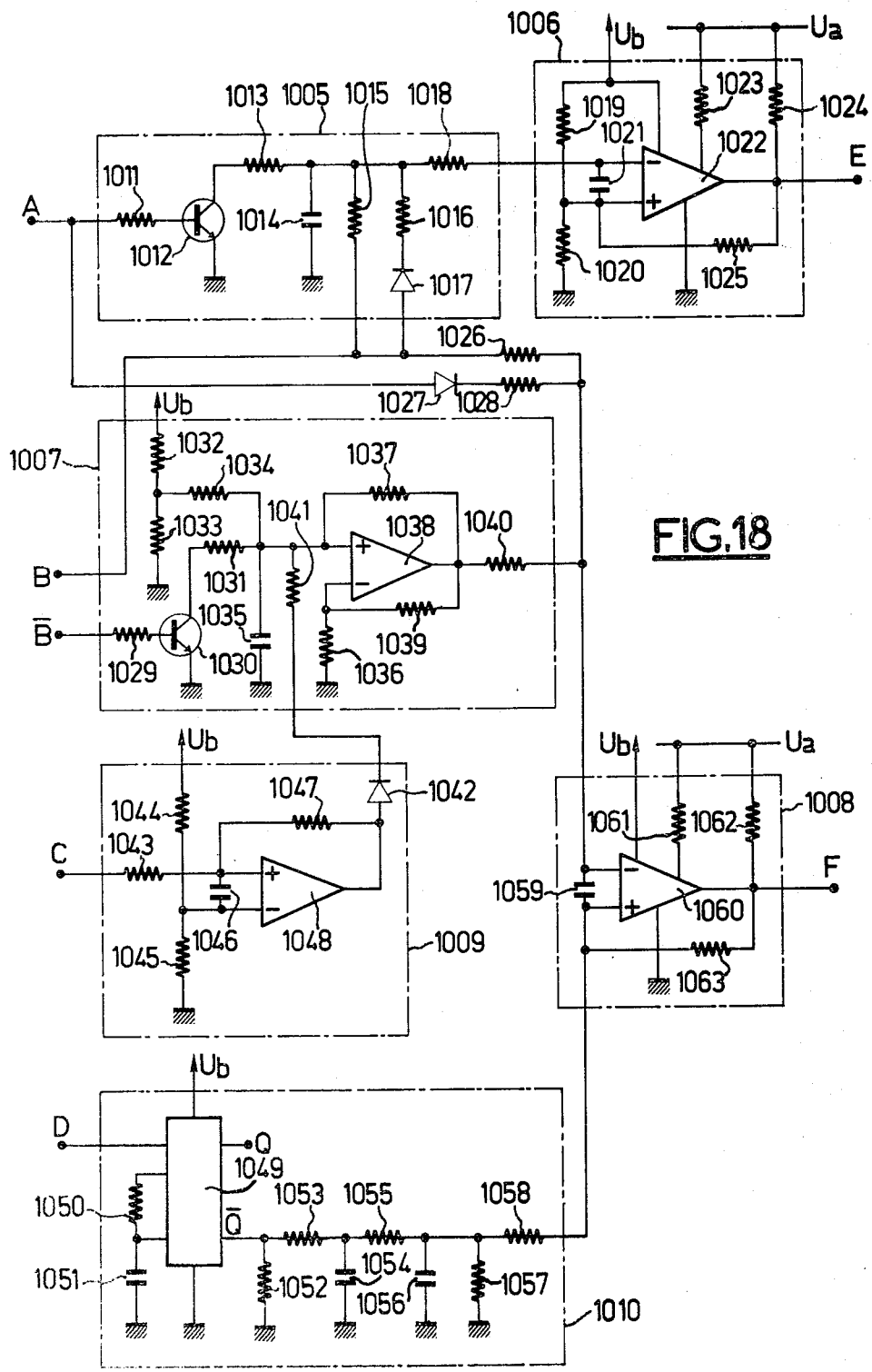
FIG. 18 is a detailed electronic diagram of an example of a circuit which can perform the functions illustrated in FIG. 17.

In the embodiment of FIG. 18 illustrated by the wave forms in FIGS. 19, 20, and 21, the ramp generator 1005 of FIG. 17 is realized by means of a capacitor 1014 which can be charged or discharged according to exponential relationships with different time constants through the following paths:

The first path comprises a resistor 1013 mounted in series with the collector of an NPN transistor 1012 the emitter of which is connected with the capacitor 1014 through ground. This first path makes it possible to discharge the capacitor 1014 rapidly when the signal A, applied to the base of the transistor 1012 through a resistor 1011, becomes high by taking on the value $U_b$ and to maintain it discharged as long as the signal A remains high. This configuration corresponds to the time between 0 and $t_1$ and to times above $t_5$ in FIG. 19. This first path has no effect on the state of the charge of the capacitor 1014 when the signal A is low. This corresponds to the time between $t_1$ and $t_5$ in FIG. 19.

A second path comprises a resistor 1015 mounted in parallel with a branch comprising a resistor 1016 in series with a diode 1017. This path is connected with the signal B and makes it possible to charge the capacitor 1014 rapidly through the resistor 1016 and the diode 1017 when the signal B becomes high ($U_b$) and to maintain it charged as long as the signal B is high and the discharge path consisting of the resistor 1013 and of the transistor 1012 is blocked by the presence of a low level signal A. This corresponds to the time between $t_1$ and $t_2$ and to the time between $t_4$ and $t_5$ in FIG. 19. This path is also used for slowly discharging the capacitor 1014 through the resistor 1015 when the signal B becomes low and for maintaining it discharged as long as the signal B remains low. This corresponds to the time between $t_2$ and $t_4$ in FIG. 19. The resistor 1013 and the transistor 1012 then have no effect, and the level of the signal A no longer affects the charging state of the capacitor 1014.

The fixed-threshold voltage comparator 1006 in FIG. 17 is realized by means of an operational amplifier 1022 which, in the example illustrated, has an output stage realized by means of an open-collector NPN transistor fed with the voltage $U_a$ through resistors 1023 and 1024. This feature makes it possible to obtain a high level value of the signal E different from the voltage $U_b$, which is common to the high level of the other signals. In particular, the voltage $U_a$ of the signal E can be established at a higher level in order to allow a suitable feed of the two electric valves $EL_1$ and $EL_2$, through a voltage-following power amplifier. On the contrary, the voltage $U_b$ at a lower and suitably stabilized level, feeds the other elements of the circuit.

The operational amplifier 1022 is mounted as a voltage comparator. A capacitor 1021 placed between its positive (+) and negative (−) inputs makes it possible to cut out the undesirable comparisons due to the accidental presence of very short interfering pulses at the (+) and (−) inputs. The common point of two resistors 1019 and 1020 which form a voltage dividing bridge between the voltage $U_b$ and ground is connected with the (+) input of the operational amplifier 1022 and with a feedback resistor 1025 the other end of which is connected with the output of the operational amplifier 1022 which supplies the signal E. The (−) input of the operational amplifier 1022 is connected through a resistor 1018 with the capacitor 1014 the voltage of which varies according to the signals A and B, as previously described. This arrangement makes it possible to apply a reference voltage to the (+) input of the amplifier 1022 which varies slightly in the same way as the voltage of its output, creating a voltage shift at the (+) input which facilitates its combination with the voltage at the (−) input at the point of comparison. This combination can be seen in FIG. 19 and is materialized by the shift marked $d_1$. Thus a signal E is obtained which has steep leading and trailing edges without any interfering oscillation.

To summarize the working of this circuit with reference to FIG. 19, it can be seen that the signal E is low when the level at the (−) input illustrated by a continuous line is higher than the level at the (+) input represented by a dashed line. This situation occurs between the times $t_4$ and $t_5$, with creation of the time delay $\Delta t_1$ between the times $t_2$ and $t_3$. On the other hand, the signal E is at its high level ($U_a$) when the level at the (+) input is higher than the level at the (−) input for the times below $t_1$, between $t_3$ and $t_4$ and above $t_5$.

The linear ramp generator 1007 of FIG. 17 is realized in the example illustrated in FIG. 18 by means of a capacitor 1035 which can be charged or discharged according to relationships with different time constants by the following paths:

A first path comprises a resistor 1031 mounted in series with the collector of a NPN transistor 1030 the emitter of which is connected with the capacitor 1035 through ground. This path makes it possible to discharge the capacitor 1035 rapidly when the signal $\bar{B}$, which is the complement to B applied to the base of the transistor 1030 through a resistor 1029, becomes high ($U_b$) and to maintain it discharged as long as the signal $\bar{B}$ is high. This situation occurs for the times between $t_7$ and $t_8$ in FIG. 20. This path has no effect on the state of charge of the capacitor 1035 when the signal B is low. This occurs for the times below $t_7$ or above $t_8$ in FIG. 20.

A second path comprises a constant current generator realized by means of an operational amplifier 1038, a resistor 1037 of a feedback loop, a resistor 1039 of a negative feedback loop, an input resistor 1036 between the (−) input and ground, an input resistor 1034 between the (+) input and the common point of resistors 1032 and 1033 which form a voltage dividing bridge between the voltage $U_b$ and ground, and a resistor 1041 which connects the (+) input with the output of an operational amplifier 1048 through a diode 1042. This path makes it possible to charge the capacitor 1035 of value C with a constant current I according to a linear relationship to time t of the form:

Voltage across the capacitor
$$1035 = U_c = (I/C) \times t = k \times t$$

In this formula, k is a constant in relation to time and only depends on the values of the capacitor 1035, of the resistors 1032, 1033, 1034, 1036, 1037 and 1039, and of the resistor 1041, if the output state of the amplifier 1048 is higher than the charging voltage of the capacitor 1035 plus the direct voltage drop of the diode 1042 in the passing state.

The fixed-threshold voltage comparator 1009 in FIG. 17 is realized by means of the operational amplifier 1048. A capacitor 1046 mounted between its (+) and (−) inputs makes it possible to cut out the undesirable comparisons due to the accidental presence of very short interfering pulses at the (+) and (−) inputs. The common point of resistors 1044 and 1045 which form a voltage dividing bridge between the voltage $U_b$ and ground is connected with the (−) input of the amplifier 1048. The (+) input is connected with the input terminal for the signal C through a resistor 1043 and with the output of the amplifier 1048 through a feedback resistor 1047. This arrangement makes it possible to apply a slight voltage shift to the (+) input of the amplifier 1048, which varies in the same way as the signal C and facilitates its combination at the point of comparison with the reference voltage applied to the (−) input. Thus an output signal is obtained from the amplifier 1048, which has steep leading and trailing edges without interfering oscillation.

To summarize the working of the above-described circuit with reference to FIG. 20, the output of the amplifier 1048 is in the low state when the input signal C is lower than the reference voltage $U_2$ applied to the (−) input.

In a first operating mode shown by a continuous line in FIG. 20, the signal $C_1$ applied to the (+) input of the amplifier 1048 always remains lower than the reference voltage $U_2$. In another configuration shown by a chain line in FIG. 20, the voltage $C_2$, on the contrary, becomes higher than the reference voltage $U_2$ from time $t_6$.

The low state output of the amplifier 1048 creates a reverse bias of the diode 1042 and cuts out the effect of the output voltage of the amplifier 1048 through the resistor 1041 and the diode 1042 on the value of the current charging the capacitor 1035. The output voltage of the amplifier 1048 therefore has no longer any effect on the value of the current charging the capacitor 1035. The output voltage of the amplifier 1038 thus varies in relation to time according to a linear relationship with a slope $p_1$ shown by a continuous line in FIG. 20.

On the other hand, the amplifier 1048 provides a high level signal (Ub) at its output when the signal C is higher than the reference voltage $U_2$ applied to the (−) input. This situation occurs for the configuration $C_2$ shown by a chain line in FIG. 20 from time $t_6$. In this case, the high state output of the amplifier 1048 creates a forward bias of the diode 1042 and allows the path comprising the resistor 1041, the diode 1042 and the output of the amplifier 1048 to act on the current generator which charges the capacitor 1035. This effect increases the value of the current charging the capacitor 1035. The output voltage of the amplifier 1038 thus varies in relation to time according to a linear relationship with a slope referenced $p_2$ in FIG. 20 higher than the previously referenced slope $p_1$. The new curve obtained is shown by a chain line in FIG. 20.

The frequency/voltage converter 1010 in FIG. 17 is realized by means of a monostable circuit 1049 which receives the frequency signal D and supplies output gating pulses of a constant width fixed by the resistor 1050 and the capacitor 1051 for each cycle of the signals D. The negative output signals $\overline{Q}$, which appear in a resistor 1052 connected with ground, are sent to a filter unit made up of resistors 1053, 1055, and 1057, and of capacitors 1054 and 1056. The utilization of the output $\overline{Q}$, which gives gating pulses with a low value of constant duration, makes it possible to obtain an almost D.C. voltage across the resistor 1057, the level of which varies according to a decreasing linear relationship when the frequency of the signals D increases. This results in a residual A.C. component which remains acceptable at a low frequency. It should be noted that this residual A.C. voltage is lower than that which would be obtained if the direct output Q of the monostable circuit 1049 was used to feed the same filter unit.

The variable threshold voltage comparator 1008 in FIG. 17 consists of an operational amplifier 1060 which is, in the embodiment illustrated in FIG. 18 and for the same advantages as previously, of the same type as the operational amplifier 1022. The amplifier 1060 is mounted as a voltage comparator. A capacitor 1059 placed between its (+) and (−) inputs, like the capacitor 1021 for the amplifier 1022, makes it possible to cut out the undesirable comparisons due to the accidental presence of very short interfering pulses at the (+) and (−) inputs. The shift $d_2$ in FIG. 20 corresponds to the shift $d_1$ in FIG. 19. The 1061 and 1062 correspond to the resistors 1023 and 1024.

The amplifier 1060 also receives the image voltage of the frequency of the signals D at its (+) input through a resistor 1058, which voltage comes from the monostable circuit 1049 and from the filter unit as just explained. The amplifier 1060 also receives the output voltage at its (+) input through a feedback resistor 1063, which voltage provides the signal F.

At its (−) input, the amplifier 1060 receives:
(1) the output voltage of the amplifier 1038, through a resistor 1040, which voltage varies with time according to an increasing linear relationship with a slope $p_1$ or $p_2$ according to the value of the signal C compared with the reference voltage $U_2$ in the fixed-threshold voltage comparator 1009;
(2) the signal B through a resistor 1026; and
(3) the signal A through a diode 1027 in series with a resistor 1028.

To summarize the working of this arrangement, reference can be made to FIGS. 20 and 21 which show two different values $F_a$ and $F_b$ of the frequency of the signals D. The output of the amplifier 1060, which provides the signal F, is at the low level ($U_a$) when the voltage level at the (−) input is lower than the voltage level at the (+) input. In the case of FIG. 20 for the frequency $F_a$ of the signal D, it can be seen that the voltage applied to the (+) input of the amplifier 1060, shown by the dashed line, brings about a high level for the signal F from the time $t_7$ to time $t_{11}$ should the signal C have the configuration $C_1$, which creates the slope $p_1$. In this case, the total duration of the time delay $\Delta t_2$ lies between time $t_8$, which corresponds to the change of the signal B to the high level, i.e. to the command to change from the third speed ratio to the second speed ratio, and time $t_{11}$ defined by the electronic device of the invention.

It should be noted that if the signal A returns to its high level as shown by the dashed line in FIG. 20 before the end of the time delay $\Delta t_2$, the signal F returns automatically to its low level (time $t_{10}$).

If the voltage of the signal C shows the configuration $C_2$, it can be seen in FIG. 20 that the total duration $\Delta t_2$ of the time delay is shorter and corresponds to the time between $t_8$ and $t_9$.

In the configuration of FIG. 21, in which the frequency $F_b$ of the signal D is higher than the frequency $F_a$, it can be seen that the voltage at the (+) input of the amplifier 1060 shown by the dashed line is lower than that in FIG. 20, thereby bringing about a shorter time delay $\Delta t_2$, which is equal either to the duration between times $t_8$ and $t'_9$ or to the duration between times $t_8$ and $t'_{11}$, according to the configuration of the signal C.

The signal F thus obtained is the combination of the signals A and B on the basis of the signals C and D.

In practice, the threshold voltage $U_2$ is set so that the voltage of the signal C is lower than $U_2$ when the driver depresses the accelerator pedal and higher than $U_2$ when he releases the pedal. In the automatic drive, the selector lever being in position A, when the driver depresses the accelerator pedal, the time delay $\Delta t_2$ defined by the device of the invention, is represented in FIG. 22 by a continuous line curve as a function of the frequency of the signal D, which is proportional to the vehicle speed.

Figure 22:
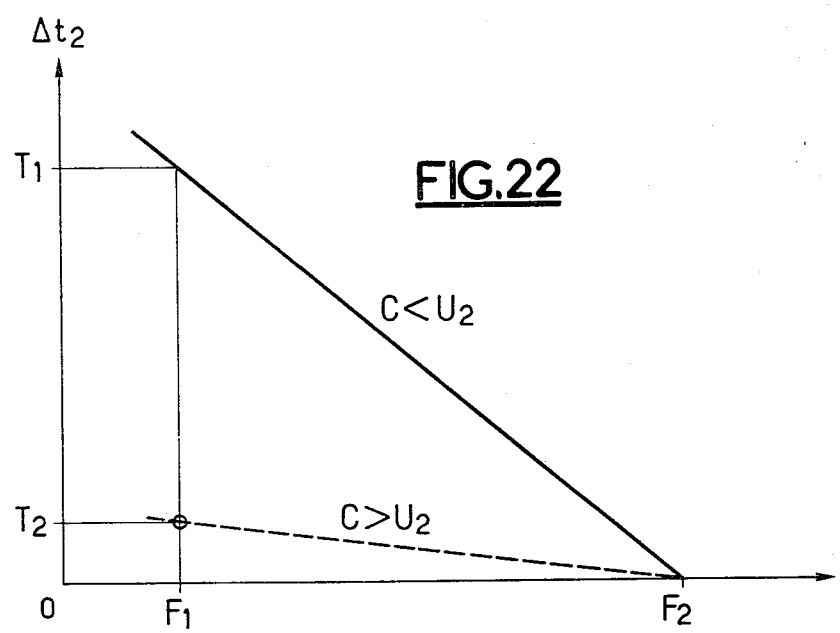
FIG. 22 is a graph plotting the time delay obtained for the second output signal in relation to the input frequency corresponding to the vehicle speed for two values of the signal depending upon the positon of the accelerator pedal.

When the driver has released the pedal, the governor $G_1$ in FIG. 3, which also receives the signal C, the voltage of which then corresponds to the "accelerator pedal released" position, and information on the vehicle speed, supplies a signal B passing from the low value to the high value on changing from the third to the second ratio at the fixed frequency $F_1$, such that the time delay obtained from the dashed line curve in FIG. 22 is $T_2$.

Finally, for the time delay $\Delta t_2$ a curve (the continuous line in FIG. 22) and a singular point are obtained in the case when the driver has released the accelerator pedal. In the manual drive, when the ratio selector level has shifted from the position A to the position 2 (third prohibited, second imposed), the value of the time delay is obtained either on the continuous line curve (if the driver depresses the accelerator pedal) or on the dashed line curve (if the driver has released the pedal), the time delay varying then in relation to the vehicle speed between $F_1$ and $F_2$ when the change is manually controlled. It should be noted that the duration $\Delta t_2$ is very short in practice, being about 20 milliseconds.

Another embodiment of the control circuit (FIGS. 23–27)

Figure 23:
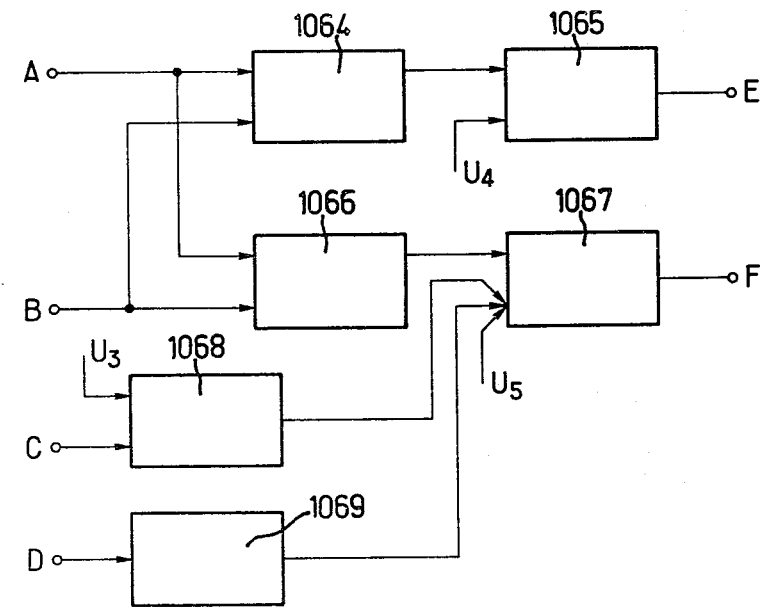
FIG. 23 is a block diagram of a second embodiment of a control circuit which can be utilized for the device of the invention.

FIG. 23 is a block diagram of another embodiment of an electronic circuit performing the functions of the diagram in FIG. 15. In this embodiment the signal E is obtained by a ramp generator 1064 which receives the input signals A and B, and by a voltage comparator 1065 with a fixed threshold $U_4$. These two elements carry out the logic combination of the input signals A and B and perform the $\Delta t_1$ time delay function as did the ramp generator 1005 and the comparator 1006 in FIG. 17.

Figure 27:
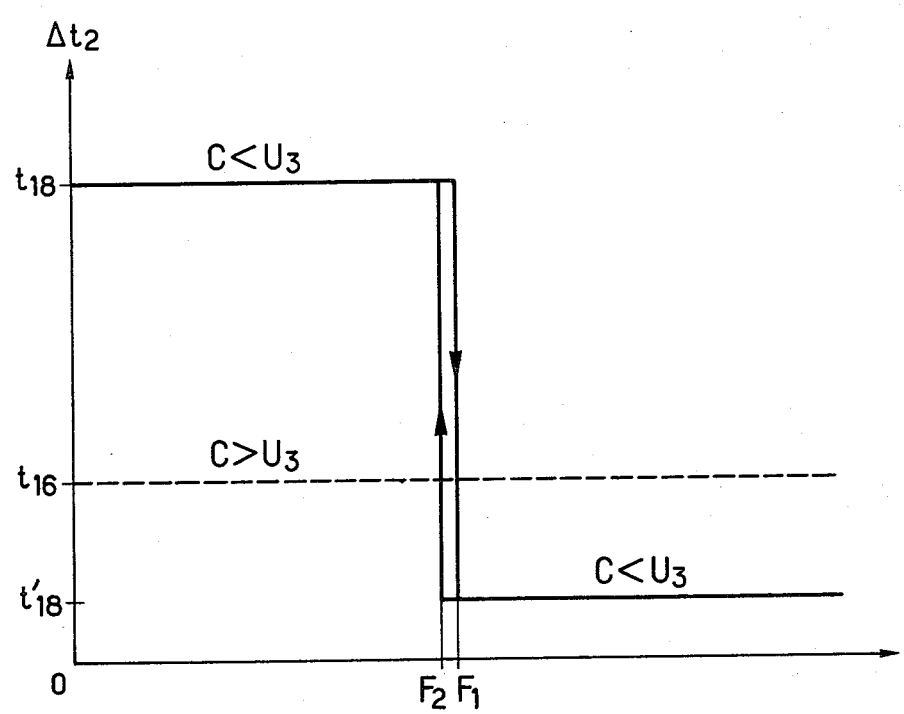
FIG. 27 is a graph plotting the three timing levels obtained by the device illustrated in FIGS. 23 to 26 in relation to the frequency of the input signal corresponding to the vehicle speed for two values of the signal depending upon the position of the accelerator pedal.

The signal F is obtained by a ramp generator 1066 which receives the input signals A and B and by a controlled-threshold voltage comparator 1067 which receives the output signal from the ramp generator 1066, a fixed threshold voltage $U_5$ modified by the threshold control coming from a voltage comparator 1068 with a fixed threshold $U_3$, which takes the level of the signal C into account, and by the threshold control coming from a fixed-threshold frequency comparator 1069 which takes the frequency of the signal D into account. This arrangement allows the logic combination of the input signals A and B and a time delay $\Delta t_2$ to be obtained, which gives three times values according to the voltage level of the signal C and the frequency of the signal D, as shown in FIG. 27. Under these conditions, instead of obtaining a continuous variation of the time delay $\Delta t_2$ as in the curve in FIG. 22, an approximation is sufficient in this case, which in return makes it possible to simplify the electronic circuit.

FIG. 24, as an example, is a detailed diagram of an electronic circuit which can be utilized to perform the functions of FIG. 23 and which will be described by means of wave form diagrams shown in FIGS. 25 and 26.

First of all, it should be noted that the ramp generator 1064 and the voltage comparator 1065 are realized by means of the electronic elements 1070 through 1084, which perform the same functions as the electronic elements 1011 to 1025 of the ramp generator 1005 and of the fixed threshold voltage comparator 1006 illustrated in FIG. 18.

The ramp generator 1066 in FIG. 23 is realized by means of the capacitor 1090 which can be charged or discharged according to exponential relationships at different time constants through the following paths:

(1) The first path comprises a resistor 1086 and a diode 1085 mounted in series and connected with the signal A which makes it possible to charge the capacitor 1090 rapidly when the signal A is high ($U_b$) and to maintain it charged as long as the signal A remains high. This configuration is shown in FIG. 25 for the times lower than $t_{12}$ and the times higher than $t_{17}$. This path does not affect the charge state of the capacitor 1090 when the signal A is low.

(2) A second path comprises a resistor 1087 mounted in parallel with a branch comprising a resistor 1088 in series with a diode 1089. This path, connected with the signal B, makes it possible to discharge the capacitor 1090 rapidly through the branch which comprises the resistor 1088 and the diode 1089, when the signal B becomes low, and to maintain it discharged as long as the signal B remains low. This configuration is shown in FIG. 25 for the times between $t_{14}$ and $t_{15}$. This path also makes it possible to charge the capacitor 1090 slowly through the resistor 1087 when the signal B becomes high ($U_b$) and to maintain it charged as long as the signal B remains high. This configuration is shown in FIG. 25 for the times higher than $t_{15}$.

The fixed-threshold voltage comparator 1068 is realized by means of electronic elements 1092 to 1097, which perform the same functions as the elements 1043 to 1048 of the fixed-threshold voltage comparator 1009 in FIG. 18. It should be remembered that the output signal from the amplifier 1096 is high ($U_b$) when the level of the signal C is higher than the fixed threshold $U_3$, as shown in FIG. 25, for the times higher than $t_{13}$, and low in the opposite case as shown in FIG. 25 for the times lower than $t_{13}$.

The fixed-threshold frequency comparator 1069 in the non-limiting embodiment in FIG. 24 is made up of electronic elements 1113 to 1139. This device is described in French Pat. No. 2,268,268 entitled "Multistate tachometric circuit" to which reference should be made for further details. This device is based upon the comparison between the reference duration of a signal generated by the circuit and the duration of the cycle of the signal to be observed.

The duration comparator consists of a capacitor 1122 which charges slowly through a resistor 1119 connected with the voltage $U_b$. The capacitor 1122 can discharge rapidly through two different paths:

(1) The first path comprises a thyristor 1120 which discharges the capacitor 1122 rapidly through a resistor 1121 for each cycle of the signal D when the positive by-passing circuit, made up of the resistors 1113, 1115, and 1117, the capacitor 1114, and the diode 1116, sends a short positive pulse to the gate of the thyristor 1120 through a resistor 1118.

(2) The second path comprises a single-junction transistor 1123 which discharges the capacitor 1122 through a diode 1124 and a resistor 1125 whenever the charging voltage of the capacitor 1122 reaches the firing voltage of the single-junction transistor 1123 defined by the value of the potentiometer divider made up of resistors 1126, 1129, 1130, 1137 and 1139, an NPN transistor 1138 and a diode 1128, which brings about the thermal compensation of the firing threshold. The value of the resistor 1119 is chosen so that the value of the current which flows through it is between the heavy current sustaining the thyristor 1120 and the weak current sustaining the single-junction transistor 1123. Thus, the single-junction transistor 1123 remains "ON" after its firing, preventing the capacitor 1122 from being charged again until the thyristor 1120 fires and so by-passes a current sufficient to block the single-junction transistor 1123 and the thyristor 1120 in succession. Then the capacitor 1122 can be charged again freely at the voltage $U_b$ through the resistor 1119.

According to whether the cycle of the input signal D is longer or shorter than the duration of the reference signal a short positive high value pulse appears on either resistor 1121 or 1125 and is sent to either path controlling a flip-flop which stores the result until the next cycle. This flip-flop may be made up of two NPN transistors 1133 and 1138 and of the resistors 1131, 1132, 1134, 1135, 1136, and 1137. The flip-flop connection is such that the transistor 1138 is saturated and the transistor 1133 blocked when the cycle of the signal D is longer than the duration of the reference signal, i.e. for a frequency lower than the set threshold. On the other hand, the transistor 1138 is blocked and the transistor 1133 saturated when the cycle of the signal D is shorter than the duration of the reference signal, i.e. for a frequency higher than the set threshold. The frequency hysteresis necessary for good stability of the circuit is provided by the resistor 1139 which is mounted on the potentiometer divider made up of the resistors 1129 and 1130 and which intervenes according to the flip-flop state. The value of the firing threshold of the signal-junction transistor 1123 increases when the increasing frequency of the signal D reaches the threshold $F_1$ (see FIG. 27), which results in increasing the duration of the reference signal which brings the decreasing frequency threshold of the signal D down to a value $F_2$ lower than $F_1$.

The controlled threshold voltage comparator 1067 is made up of an operational amplifier 1109 which, for the same reasons as previously mentioned, is of the same type and mounted in the same way as the amplifiers 1022 and 1060 in FIG. 18. The charging voltage for the capacitor 1090 which varies with time according to the levels of the inputs A and B, is applied through a resistor 1091 to its $(-)$ input.

The $(+)$ input of the amplifier 1109 is connected with a potentiometer divider made up of resistors 1100 to 1104 and of NPN transistors 1103 and 1105 and with a feedback resistor 1112, the other end of which is connected with the output of the operational amplifier 1109 which supplies the signal F. This arrangement makes it possible to apply a reference voltage to the $(+)$ input of the amplifier 1109, which can take on several values according to the blocked or saturated state of the two transistors 1103 and 1105. This reference voltage varies slightly in the same direction as the output voltage by creating a shift of the $(+)$ input voltage which favors its combination with the voltage sent to the $(-)$ input at the comparison point in order to obtain a signal F, which has steep leading and trailing edges without any interfering oscillation.

The transistor 1103 is blocked when the output signal from the amplifier 1096, connected with the base of the transistor 1103 through a resistor 1098, is low, i.e. when the level of the signal C is lower than the threshold $U_3$. On the other hand, the transistor 1103 is saturated when the output signal from the amplifier 1096 is high ($U_b$), i.e. when the signal C is higher than the threshold $U_3$.

The transistor 1105 is blocked when a NPN transistor 1106, which is connected between the base and the emitter of the transistor 1105, is saturated, i.e. when the output signal from the amplifier 1096 connected with the base of the transistor 1106 through a resistor 1099 is high ($U_b$), which means that the signal C is higher than the threshold $U_3$. In the opposite case, with the output of the amplifier 1096 being at the low level and the signal C lower than the threshold $U_3$, the transistor 1106 is blocked and it has no effect on the "ON" state of the transistor 1105, which is blocked when the signal, which comes from the frequency comparator and is applied to the collector of the transistor 1138 connected with the base of the transistor 1105 through a resistor 1107, is at the low level, i.e. when the frequency of the signal D is lower than the frequency threshold set at $F_1$. On the other hand, the transistor 1105 is saturated when the output signal from the frequency comparator is high ($U_b$), i.e. when the frequency of the signal D is higher than the frequency threshold set at $F_2$ and when transistor 1106 is blocked.

The highest reference threshold $U_5$ of the amplifier 1109 is obtained when the two transistors 1103 and 1105 are blocked, i.e. when the signal C is lower than the threshold $U_3$ and when the frequency of the signal D is lower than the threshold $F_1$. The charging voltage for the capacitor 1090 then reaches the high threshold $U_5$ at time $t_{18}$ in FIG. 25.

The lowest reference threshold $U_6$ of the amplifier 1109 is obtained when the transistor 1103 is blocked and when the transistor 1105 is saturated, i.e. when the signal C is lower than the threshold $U_3$ and when the frequency of the signal D is higher than the threshold $F_2$. The charging voltage for the capacitor 1090 then reaches the low threshold $U_6$ at time $t'_{18}$ in FIG. 26.

The reference threshold of the amplifier 1109 takes on the intermediate value $U_7$ when the transistor 1103 is saturated and the transistor 1105 blocked, i.e. when the signal C is higher than the threshold $U_3$, whatever the frequency of the signal D. The charging voltage for the capacitor 1090 then reaches the intermediate threshold $U_7$ at time $t_{16}$ in FIGS. 25 and 26.

Reference can be made to FIGS. 25 and 26 for a better understanding of the working of the preceding circuit for two values $F_a$ and $F_b$ of the frequency of the signal D. It can be seen from these figures that the duration of the high level ($U_a$) which corresponds to the time delay $t_2$ is counted from time $t_{15}$ to times $t_{16}$, $t_{18}$, or $t'_{18}$, according to the value of the signals C and D. It should be noted, as previously, that in the case shown by a dashed line in which the signal A returns to the high level before the complete end of this time delay, the signal F returns immediately to its low level at the time marked $t_{17}$.

When the vehicle driver depresses the accelerator pedal, the time delay is $t_{18}$ or $t'_{18}$ according to the vehicle speed (FIG. 27). On the other hand, when the driver releases the accelerator pedal, the time delay is $t_{16}$.

Finally, it can be seen that the sequential switching device of the invention provides a signal F for the control of the second electric valve $EL_2$, which is the combination of the signals A and B, representing the speed change thresholds on the basis of the signals C and D, which respectively represent the position of the accelerator pedal and the vehicle speed. Thus, a varying duration is obtained for the transient change between the third and second transmission ratios.

To those skilled in the art to which this invention relates, many changes in construction and widely differing embodiments and applications of the invention will suggest themselves without departing from the spirit and scope of the invention. The disclosure and the description herein are purely illustrative and are not intended to be in any sense limiting.

We claim:

1. A device controlling a multi-stage automatic transmission for an engine-driven vehicle, with three forward drive ratios and change under torque, damped by a hydrokinetic torque converter, and one reverse drive, of the type consisting of an epicyclic gear train actuated by two clutches and two brakes hydraulically controlled, which system comprises a hydraulic distribution unit monitored by two electric valves in order to selectively feed the two clutches and the two brakes on the basis of data concerning the running of the vehicle fitted with the transmission, comprising:
   control means for controlling the two electric valves in response to three different states of the two electric valves for providing selective feeds corresponding respectively to each of the three forward drive ratios and for providing an additional control of said electric valves in response to a fourth transient state for the transmission between the third and second forward drive ratios.

2. A control device according to claim 1 further comprising first and second change valves, each provided with a two-position distribution spool.

3. A control device according to claim 1 further comprising means for determining the period for which the fourth transient state is maintained according to the speed of the vehicle and the load on the vehicle engine.

4. A control device according to claim 2 further comprising:
   a two-spool relay valve capable of defining three states according to respective positions, and having inlets and outlets, with the relay valve outlets being connected to one of said clutches and to the two brakes,
   a fast feed duct provided with a wide opening restriction,
   a slow feed duct fitted with a narrow opening restriction,
   both said ducts being connected to said relay valve but to different outlets and
   both said ducts being connected to one said brake, namely, that one that is filled with fluid to establish the second of the three forward drive ratios, change valves being connected to each other and to the inlets of the relay valve in such a manner that, in said fourth transient state of the two electric valves, the filling of the brake required to establish the second forward drive ratio is effected through the relay valve at high speed via said fast feed duct and
   such that, in another state of the two electric valves corresponding to the steady state of the second forward drive ratio, the filling of the above-mentioned brake is effected through the relay valve at low speed via said slow feed duct.

5. A control device according to claim 4, wherein
   the fast feed duct transmits the line pressure to the relay valve through (A) said wide opening restriction via the second change valve, said second change valve having a control electric valve which is then in the de-energized position, and (B) directly through said narrow opening restriction,
   said electric valve in its energized position being closed and placing said second change valve in a position where it cuts off the flow of fluid in the fast feed duct so that the line pressure is now transmitted to the relay valve only directly through said narrow opening restriction.

6. A control device according to claim 4, wherein the relay valve also comprises:
   an intermediate chamber separating its two distribution spools,
   a return spring tending to push both spools back in one direction with a force that slightly exceeds the friction force between the spools and the valve body.

7. A control device according to claim 6, wherein the relay valve further comprises:
   an end chamber communicating with the clutch required for the third forward drive ratio, said end chamber when subjected to hydraulic pressure making one of the spools move against the pressure existing in the intermediate chamber from a position in which the brake required for the second forward drive ratio is fed through the relay valve as far as and up to a position after which the said brake is not fed.

8. A control device according to claim 7, wherein
   the pressure in the intermediate chamber of the relay valve is a set pressure,
   and wherein this set pressure is equal, when the two electric valves monitoring the two change valves are de-energized and open, to an intermediate pressure existing between two series restrictions placed in a duct subjected to the line pressure.

9. A control device according to claim 6, wherein said relay valve having an end chamber communicating with the clutch which is engaged to obtain the reverse drive ratio,
   the feed to the brake required for the reverse drive ratio being effected through the relay valve when both spools of the relay valve have been pushed against said return spring by the pressure existing in said end chamber, and
   a restriction being placed in the duct feeding said clutch and so that, in this position of the relay valve, the above-mentioned brake is filled before the clutch.

10. A control device according to claim 1, further comprising
    a pressure regulating valve defining, for the hydraulic fluid feeding the control device, a first high pressure level for the reverse drive and the neutral position, a second intermediate pressure level defined between two series restrictions for the first forward drive ratio, and a third low pressure level for the second and third forward drive ratios.

11. A control device according to claim 1, further comprising
    manual valve means for enabling the device to be fed with hydraulic fluid and for enabling the clutch needed for the various forward drive ratios to be fed directly.

12. A control device according to claim 1, for a transmission having a gearbox converter, and a lubricating circuit, further comprising pressure limiting valve means for supplying hydraulic fluid to the gearbox converter and the lubrication circuit of the transmission.

13. A control device according to claim 4, wherein there is a manual valve and the various components of said control device are arranged in such a manner that when the electric valve controlling the first change valve is open, with the electric valve controlling the second change valve is closed, the relay valve can be supplied with hydraulic fluid by the manual valve only, so that, when the manual valve is not supplying the relay valve either, the clutch required for the reverse drive ratio and the third forward drive ratio, the brake required for the reverse drive ratio, and the brake required for the second forward drive ratio are all emptied and the spools of the relay valve are repulsed by the return spring.

14. A control device according to claim 4, wherein there is a manual valve and a pressure-regulating valve and the various components of said control device are so arranged that when the electric valve controlling the first change valve is open and the electric valve controlling the second change valve is closed, and with the manual valve being positioned so as to feed the clutch required for all the forward drive ratios, the two change valves allow fluid to escape downstream of two restrictions which allow the pressure regulating valve to thus establish the line pressure at the intermediate level.

15. A control device according to claim 4, wherein there is a manual valve and a pressure-regulating valve and when the two electric valves controlling the two change valves are closed and the manual valve VM positioned so as to supply the clutch required for the forward drive ratios, the hydraulic fluid at the line pressure established by the pressure-regulating valve is at the low level and feeds the intermediate chamber of the relay valve and the brake required for the second forward drive ratio through the relay valve.

16. A control device according to claim 4, wherein there is a manual valve and a pressure-regulating valve and the relay valve has an intermediate chamber and an end chamber, and the various components of the device are so arranged that when the two electric valves controlling the two change valves are open, and the manual valve positioned so as to supply the clutch required for all the forward drive ratios, the first change valve lets fluid escape downstream of two series restrictions defining a set pressure less than the line pressure, the intermediate chamber of the relay valve being fed at this set pressure, the clutch required for the third forward drive ratio being fed at the line pressure through a restriction via the two change valves and the end chamber of the relay valve is subjected to the pressure existing in that clutch as it fills.

17. A system for controlling a multi-stage automatic transmission with three forward drive ratios with speed changing under torque for automotive vehicles having an accelerator pedal, comprising
 a hydraulically controlled brake and
 a gearbox capable of defining a second forward drive ratio when the hydraulically controlled brake is put on and a third forward drive ratio when the brake is released, comprising means such that:
 (a) when the driver depresses the accelerator pedal, the change down from the third to the second ratio is effected first of all via a transient state during which the brake is fed at high speed, the duration of this transient state being inversely proportional to the vehicle speed, followed by a steady state corresponding to the second forward drive ratio during which the brake is fed at low speed; and
 (b) when the driver does not depress the accelerator pedal, the change down from the third to the second ratio is effected first of all via a transient state during which the brake is fed at high speed, with this state being of short duration, followed by a steady state corresponding to the second forward drive ratio during which the brake is fed at low speed.

18. A sequential switching device for first and second electric valves monitoring a hydraulic control device for an automatic transmission having three forward drive ratios with the change being done under torque, and one reverse ratio, on the basis of signals depending upon the running of the vehicle equipped with the transmission and particularly of two signals A and B corresponding respectively to the threshold of the change from the first to the second forward drive ratio and to the threshold of the change from the second to the third forward drive ratio, of a signal C depending upon the position of the accelerator pedal and of a signal D depending upon the vehicle speed, comprising
 a first processing unit for the two ratio change threshold signals A and B generating a first control signal E for the first electric valve with a constant time delay of $\Delta t_1$, and
 a second processing unit for the two ratio change threshold signals A and B receiving the signal C depending upon the position of the accelerator pedal and the frequency signal D depending upon the vehicle speed and generating a second control signal F for the second electric valve with a varying time delay $\Delta t_2$ the duration of which depends upon the signals C and D.

19. A sequential switching device according to claim 18, wherein the first processing unit comprises a ramp generator which receives the change threshold signals A and B and is connected with a fixed threshold voltage comparator which defines the first control signal E.

20. A switching device according to claim 19, wherein the ramp generator comprises
 a capacitor,
 a first path connected to said capacitor for charging and discharging the capacitor, the first path being connected with the first change threshold signal A and comprising an NPN transistor receiving the said signal on its base in order to allow a rapid discharge when the signal A is at the high level and to maintain the discharge state of the capacitor as long as the signal A remains at this high level, the first path having no effect when the signal A is at the low level, and
 a second path connected to the capacitor and with the second change threshold signal B and comprising a resistor mounted in parallel with a series combination of a resistor and of a diode in order to allow a rapid charge of the capacitor when the signal B is at the high level and to maintain the charge state of the capacitor as long as the signal B remains at the high level, with the previous signal A being at the low level, the said second path also allowing the capacitor to be slowly discharged, when the signal B is at the low level, and maintained in the discharged state by cutting out the effect of the first path.

21. A switching device according to claim 19, wherein the fixed threshold voltage comparator comprises
 an operational amplifier,
 means for feeding to the operational amplifier a voltage $U_a$ differing from a high level voltage $U_b$ of the other said signals, the negative input of the said amplifier being connected with the output of the ramp generator and the positive input connected with a reference voltage and with a feedback resistor.

22. A switching device according to claim 18, wherein the second processing unit comprises a linear ramp generator which receives a signal $\overline{B}$ complementary to the second change threshold signal and a second signal from a fixed-threshold voltage comparator generating said second signal and itself fed with the signal C depending upon the position of the accelerator pedal in order to define the slope of the generated ramp.

23. A switching device according to claim 22, wherein the linear ramp generator comprises a capacitor which can be charged and discharged according to different time constants through a first path which has a resistor in series with an NPN transistor, which brings about a rapid discharge of the capacitor when the complement $\overline{B}$ to the second change threshold signal is at the high level, and maintains the capacitor discharged as long as the said signal complement $\overline{B}$ is maintained at this level, this first path having no effect on the state of charge of the capacitor when the said signal complement $\overline{B}$ is at the low level, and a second path which has an operational amplifier equipped with a feedback loop and with a negative feedback loop in order to charge the capacitor with a constant current based on the result of a comparison between the signal C depending upon the position of the accelerator pedal and a reference voltage.

24. A switching device according to claim 22, wherein the second processing unit further comprises a variable threshold voltage comparator equipped with a feedback loop, said comparator receiving a voltage representing the frequency of the frequency signal D depending upon the vehicle speed at its positive input, said comparator receiving the output signal from the linear ramp generator and the two change threshold signals A and B at its negative input.

25. A sequential switching device according to claim 18, wherein the second processing unit comprises a ramp generator which receives the two change threshold signals A and B.

26. A switching device according to claim 25, wherein the ramp generator comprises a capacitor which can be charged and discharged through:

a first path made up of a resistor and a diode connected with the first threshold signal A in order to bring about a rapid charge of the capacitor when the signal A is at the high level, the said first path having no effect on the capacitor when the signal A is at the low level; and a second path made up of a resistor mounted in parallel with a series combination with the second change threshold signal B in order to bring about a rapid discharge of the capacitor when the signal B is at the low level and a slow charge when the said signal B changes to the high level.

27. A switching device according to claim 25 further comprising, a fixed threshold frequency comparator which receives the frequency signal D depending upon the vehicle speed and comprises a comparator which compares the reference duration of a signal generated by the circuit with the duration of the cycle of the input signal D and sends a signal to either input of a flip-flop which stores the result until the following cycle.

28. A switching device according to claim 25, wherein the second processing unit comprises a controlled threshold voltage comparator which receives the output signal from the ramp generator and the output signals from the fixed threshold voltage comparator which processes the signal C depending upon the position of the accelerator pedal, and the output signal from the fixed threshold frequency comparator which processes the frequency signal D depending upon the vehicle speed.

29. A switching device according to claim 28, wherein the controlled threshold voltage comparator comprises an operational amplifier and three transistors respectively controlled by the output signal from the fixed threshold voltage comparator which processes the signal C depending upon the position of the accelerator pedal, and by the output signal from the fixed threshold frequency comparator which processes the frequency signal D depending upon the vehicle speed.

* * * * *